United States Patent
Xu et al.

(10) Patent No.: US 11,353,933 B2
(45) Date of Patent: Jun. 7, 2022

(54) SELF-ACTUATING HINGE MECHANISM FOR ELECTRONIC DEVICE

(71) Applicant: Apple Inc., Cupertino, CA (US)

(72) Inventors: Qiliang Xu, Livermore, CA (US); Kevin M. Robinson, Sunnyvale, CA (US); Xiaonan Wen, San Jose, CA (US); Shingo Yoneoka, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 195 days.

(21) Appl. No.: 16/885,045

(22) Filed: May 27, 2020

(65) Prior Publication Data

US 2021/0373610 A1  Dec. 2, 2021

(51) Int. Cl.
G06F 1/16 (2006.01)
F16M 11/10 (2006.01)
G06F 3/01 (2006.01)

(52) U.S. Cl.
CPC ............ G06F 1/1681 (2013.01); F16M 11/10 (2013.01); G06F 3/013 (2013.01); *G06F 2200/1637* (2013.01)

(58) Field of Classification Search
CPC ..... G06F 1/1675; G06F 1/1677; G06F 1/1681
See application file for complete search history.

(56) References Cited

U.S. PATENT DOCUMENTS

| | | | |
|---|---|---|---|
| 9,459,691 B2 | 10/2016 | Chen et al. | |
| 10,396,272 B2 | 8/2019 | Bryson et al. | |
| 10,739,826 B1 * | 8/2020 | Knoppert | G06F 1/166 |
| 11,009,921 B1 * | 5/2021 | Bharadwaj | G06F 1/1652 |
| 2002/0069483 A1 | 6/2002 | Savolainen et al. | |
| 2004/0216273 A1 | 11/2004 | Kang et al. | |
| 2005/0046374 A1 * | 3/2005 | Ogawa | G06F 1/1677 318/614 |
| 2005/0050683 A1 | 3/2005 | Tonogai | |
| 2012/0075166 A1 | 3/2012 | Marti et al. | |
| 2017/0357292 A1 * | 12/2017 | Cho | G06F 1/1616 |
| 2018/0267574 A1 * | 9/2018 | Cho | G06F 3/017 |
| 2019/0138054 A1 | 5/2019 | Alva et al. | |
| 2020/0029449 A1 * | 1/2020 | Makinen | G06F 1/1681 |
| 2020/0318407 A1 * | 10/2020 | Meyers | E05D 11/087 |
| 2021/0064096 A1 * | 3/2021 | Channaiah | E05D 11/1078 |
| 2021/0216104 A1 * | 7/2021 | Huang | G06F 1/1681 |
| 2021/0373610 A1 * | 12/2021 | Xu | G06F 1/1681 |

* cited by examiner

*Primary Examiner* — Anthony Q Edwards

(74) *Attorney, Agent, or Firm* — Brownstein Hyatt Farber Schreck, LLP

(57) ABSTRACT

A notebook computer may include a display portion, a base portion, a hinge mechanism movably coupling the display portion to the base portion, an optical sensing system configured to capture an image of an object, an actuation system comprising a shape-memory alloy member coupled to the base portion and the display portion and configured to move the display portion relative to the base portion, and a processing system. The processing system may be configured to determine a target position for the display portion based at least in part on a location of the object in the image and cause the actuation system to actuate the hinge mechanism to move the display portion, relative to the base portion, from an initial position to the target position.

20 Claims, 18 Drawing Sheets

SELF-ACTUATING HINGE MECHANISM FOR ELECTRONIC DEVICE

FIELD

The subject matter of this disclosure relates generally to electronic devices, and more particularly, to hinge mechanisms for electronic devices.

BACKGROUND

Modern consumer electronic devices take many shapes and forms, and have numerous uses and functions. Devices such as laptop computers may include base portions that are coupled to display portions via a hinge mechanism or other flexible coupling. A user may open and close the laptop computer by rotating the display portion relative to the base portion. In this way, the laptop computer can be made smaller and more portable for transport and/or storage. Other devices, such as tablet computers, may also be attached to accessories that facilitate rotation or pivoting of the tablet relative to the accessory. For example, a keyboard or a stand with a hinge mechanism or other flexible coupling may be removably attached to a tablet computer.

SUMMARY

A notebook computer may include a display portion, a base portion, a hinge mechanism movably coupling the display portion to the base portion, an optical sensing system configured to capture an image of an object, an actuation system comprising a shape-memory alloy member coupled to the base portion and the display portion and configured to move the display portion relative to the base portion, and a processing system. The processing system may be configured to determine a target position for the display portion based at least in part on a location of the object in the image and cause the actuation system to actuate the hinge mechanism to move the display portion, relative to the base portion, from an initial position to the target position. The notebook computer may further include a position feedback system configured to determine an actual position of the display portion relative to the base portion.

The base portion may include a keyboard, the shape-memory alloy member may be a first shape-memory alloy member and may be configured to produce a first force to move the display portion in a first direction relative to the base portion. The actuation system may further include a second shape-memory alloy member configured to produce a second force to move the display portion in a second direction, opposite the first direction, relative to the base portion. The optical sensing system may include a camera and may be coupled to the display portion, and the processing system may be configured to cause a first electrical current to be applied to the first shape-memory alloy member to produce the first force, and cause a second electrical current to be applied to the second shape-memory alloy member to produce the second force.

The processing system may be configured to determine the target position for the display portion by determining a location of a user in the image captured by the optical sensing system, determining an offset between the location of the user in the image and a target user location, and determining the target position based at least in part on the offset. Determining the location of the user in the image may include determining the location of the user's eyes in the image.

The shape-memory alloy member may be a first shape-memory alloy member and may be configured to move the display portion towards an open position relative to the base portion in response to having a first current passed therethrough, and the actuation system may further include a second shape-memory alloy member configured to move the display portion towards a closed position relative to the base portion in response to having a second current passed therethrough. The notebook computer may further include a first anchor retaining a first end of the first shape-memory alloy member to the base portion, and a second anchor retaining a second end of the first shape-memory alloy member to the display portion.

A portable computing system may include a display portion, a base portion movably coupled to the display portion, an optical sensing system configured to determine a gaze direction of a user, and an actuation system including a first shape-memory alloy member configured to rotate the display portion in a first direction relative to the base portion and a second shape-memory alloy member configured to rotate the display portion in a second direction relative to the base portion, the second direction opposite the first direction. The portable computing system may further include a processing system configured to determine a target position for the display portion based at least in part on the gaze direction of the user and cause the actuation system to rotate the display portion, relative to the base portion, from an initial position to the target position. The optical sensing system may include a projector configured to project a pattern of light onto the user, and a sensor configured to sense at least a portion of the pattern of light that is reflected by the user.

The optical sensing system may be configured to determine an angle between the gaze direction of the user and a plane defined by the display portion, and the target position may correspond to a position of the display portion at which the angle between the gaze direction of the user and the plane defined by the display portion is equal to a target viewing angle. The portable computing system may further include a position feedback system configured to determine an actual position of the display portion relative to the base portion.

The base portion may include a body, a coupling system configured to removably couple the base portion to the display portion, and a hinge mechanism movably coupling the body to the coupling system. The coupling system may include a first magnetic attachment system, and the display portion may include a second magnetic attachment system configured to magnetically couple to the first magnetic attachment system. The body of the base portion may include a keyboard.

A portable computing system may include a display portion, a base portion, a hinge mechanism movably coupling the display portion to the base portion, a shape-memory alloy member extending through the hinge mechanism and configured to articulate the hinge mechanism to move the display portion relative to the base portion, a sensing system configured to detect a physical disposition of a user relative to the portable computing system, and a processing system configured to determine a target position for the display portion based at least in part on the physical disposition of the user and cause the shape-memory alloy member to articulate the hinge mechanism to move the display portion, relative to the base portion, from an initial position to the target position. The physical disposition of the user relative to the portable computing system may correspond to at least one of an orientation of the user's eyes or a position of the user's face.

The portable computing system may further include a brake positioned in the base portion and configured to selectively inhibit motion of the shape-memory alloy relative to the base portion. The processing system may be configured to engage the brake to inhibit motion of the shape-memory alloy relative to the base portion while the shape-memory alloy is articulating the hinge mechanism. The processing system may be further configured to cause the shape-memory alloy member to articulate the hinge mechanism to move the display portion, relative to the base portion, from a closed position to an open position.

The portable computing system may further include a touch sensitive input system configured to detect an input and the processing system may be configured to cause the shape-memory alloy to articulate the hinge mechanism to move the display portion, relative to the base portion, from the closed position to the open position in response to detection of the input.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
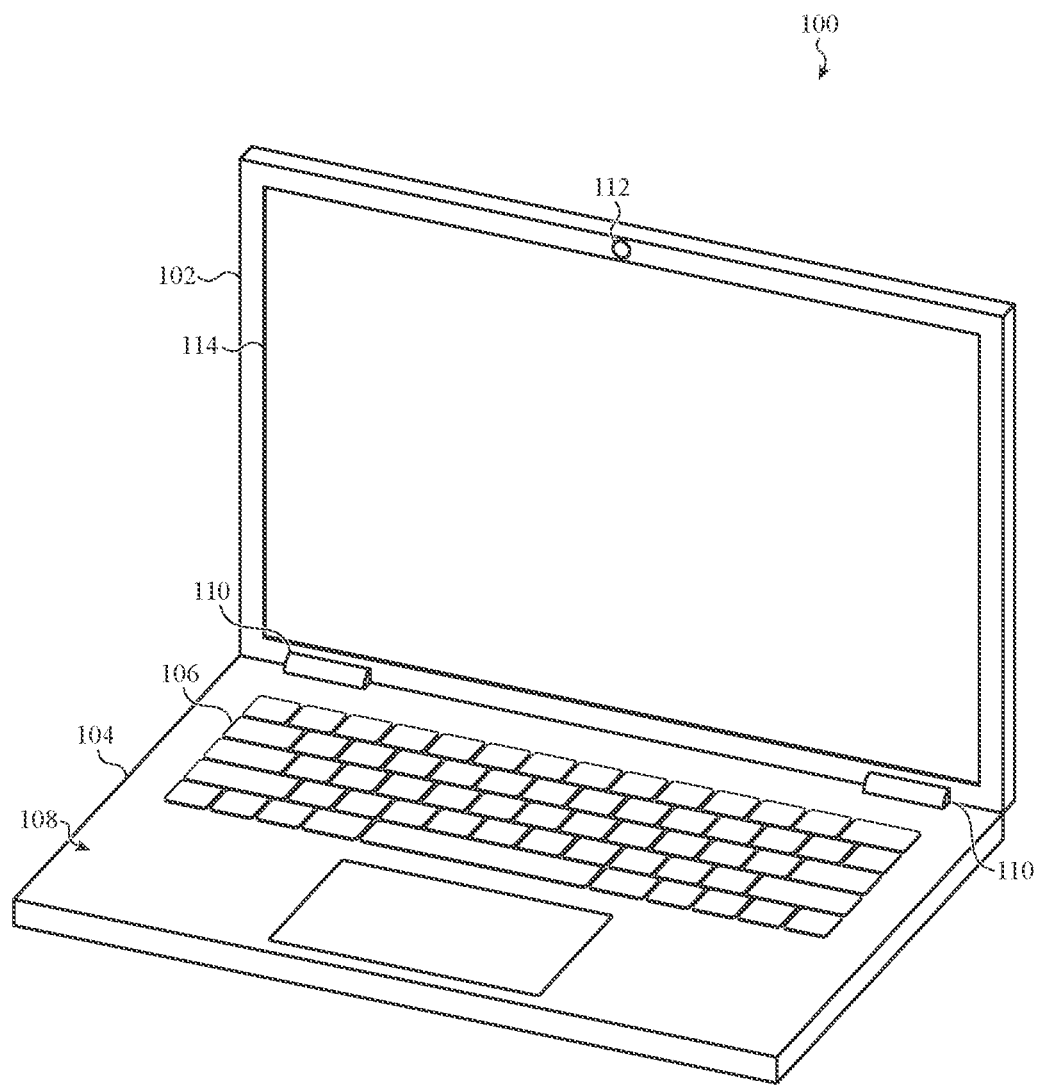
FIG. 1 depicts an example electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are generally directed to electronic devices with displays that are rotatably or movably coupled to another structure, such as a base, stand, or the like, and are configured to automatically adjust the position of the display relative to the other structure. For example, a laptop computer (also referred to simply as a "laptop") may include a display portion or lid that is coupled to a base portion via a hinge or other suitable mechanism that allows the lid to move relative to the base portion (e.g., to open and close the laptop). The laptop may also include an actuation system that can automatically move the display portion relative to the base portion.

Automatic motion of the display portion of a laptop may be used to provide various useful functions. For example, the display portion may be automatically moved in order to attempt to optimize or improve the quality of the graphical output as viewed by a user. More particularly, the angle at which a display is viewed by a user may affect the perceived graphical parameters of the display, such as brightness, contrast, color fidelity, and the like. Accordingly, in order to attempt to maintain the display at its optimum position relative to a viewer, a laptop may use the actuation system to automatically adjust the position of the notebook based on where the view is positioned relative to the laptop. In this way, the viewer may experience the best performance of the display without having to continually manually adjust the display despite repositioning of the laptop or the user itself.

As another example, the display portion of a laptop may be automatically moved in order to maintain a subject (e.g., a viewer's face) in the field of view of a camera that is integrated with the display portion. More particularly, the display portions of laptop computers may include cameras, which may be used to capture images of the user (e.g., for video conferences, image capture, etc.). Accordingly, the laptop may analyze the images being captured by the camera and, based on the image analysis, automatically move the display portion to attempt to maintain the viewer's face in a particular location in the captured image. In this way, the user can move around naturally during video conferences and other image capture operations without having to manually adjust the camera to maintain a target image framing.

An actuation system for the display portion of a laptop computer (or other devices, as described herein) may use shape-memory alloy material to provide the motive force to move the display portion. Shape-memory alloy (SMA) materials change shape (e.g., expand or contract) based on their temperature. Thus, for example, an electrical current or electrical signal applied to an SMA material may heat the SMA material, thus causing the SMA material to change shape. Allowing the SMA material to cool (either via passive or active cooling) may also result in the SMA material changing shape. Accordingly, by controlling the temperature of the SMA material, the actuation system may cause the display portion of the laptop computer to move in an intended direction.

Devices other than laptop computers may also benefit from the automatic display actuation systems and operations described herein. For example, displays for desktop computers (and/or desktop computers integrated into a display housing) may be supported by stands that allow the displays to move relative to the stands. As another example, tablet computers may be removably couplable to stands or other accessories that support the tablet computer in an upright orientation in a manner similar to a laptop computer. These types of devices may also benefit from a system that can move the displays based on information about the user's position, location, gaze direction, or the like. For example, the display may be automatically positioned to attempt to optimize the display performance (as perceived by the user), to maintain the user in the field of view of an integrated camera, or the like.

FIG. 1 depicts a computing device 100 (or simply "device 100"). The device 100 may be or may resemble a laptop computer, also referred to as a notebook computer, that has a display portion 102 and a base portion 104 movably coupled to the display portion 102 (e.g., so that the display portion 102 is able to rotate, pivot, flex, articulate, or otherwise move relative to the base portion 104).

The display portion 102 includes a display 114 that provides a primary means of conveying visual or graphical information to the user, such as by displaying graphical user interfaces. The display 114 may include various display components, such as liquid crystal display (LCD) components, light source(s) (e.g., light emitting diodes (LEDs), organic LEDs (OLEDs)), filter layers, polarizers, light diffusers, covers (e.g., glass or plastic cover sheets), and the like. The display 114 may be configured to be viewed by a user at a certain angle and/or orientation in order to provide the most attractive or otherwise desirable graphical appearance. For example, the display 114 may be configured to produce its best optical and/or graphical performance (e.g., as perceived by a user) when the user's eyes are positioned along a vector extending perpendicularly from a centroid of the display 114 (e.g., a central point of the display). As described herein, the display portion 102 may be configured to automatically move relative to the base portion 104 to maintain the user's eyes or face along the desired vector.

The display portion 102 may also include an optical sensing system 112. The optical sensing system 112 may include various different types of sensors and/or systems that are used to sense, detect, and/or capture, information, including, for example, cameras, biometric sensors, light detection and ranging (LIDAR) sensors, infrared sensors, or the like. As one example, the optical sensing system 112 may include a front-facing camera that is configured to capture images (e.g., still images and/or video images). The front-facing camera may include one or more lenses, optical sensors, and any other components to facilitate image capture functions. The optical sensing system 112 may also include a biometric sensing system that may be used to detect and/or determine a physical disposition of a user relative to the device 100, such as the user's gaze direction, an orientation of the user's face, head, or eyes relative to the device 100, and the like. The biometric sensing system may include a projector that projects an optical pattern (e.g., a pattern of dots) onto a user, and an image capture system (e.g., a camera) that captures an image of the user's face with the projected dots. The biometric sensing system may then analyze the image to determine the user's gaze direction, the position or location of the user's head or face, or any other physical disposition information of the user. The biometric sensing system may include other components instead of or in addition to those described herein, and may be configured to capture biometric or other physical information about a user using other techniques and/or systems. Other types of sensing systems may be used instead of or in addition to optical sensing systems, including but not limited to ultrasonic sensors, thermal sensors, acoustic sensors, and microphones.

Information captured or otherwise produced by the optical sensing system 112 may be used to determine a target position for the display portion 102. For example, and as described herein, the optical sensing system 112 may determine a position of the user's face relative to the display portion 102, or it may determine a gaze direction of the user. A processing system of the device 100 may determine, based on the position of the user's face and/or the gaze direction, a target position for the display portion 102. The processing system may cause the display portion 102 to automatically rotate or otherwise move to the target position.

The base portion 104 may house various systems and/or components of the device, including, for example, a processing system, one or more batteries, memory, circuit elements, and the like. The base portion 104 may also include various types of input systems for receiving inputs from a user. For example, the base portion 104 may include a keyboard 106 (e.g., for receiving typing or other keyed inputs) and a trackpad region 108 (e.g., for receiving touch inputs such as gestures, multi-touch inputs, swipes, taps, etc.).

The base portion 104 may be movably coupled to the display portion 102 via a hinge mechanism 110. The hinge mechanism 110 may be any suitable mechanism that allows the display portion 102 to move relative to the base portion 104, such as to rotate the display portion 102 between a closed position and an open position (or otherwise rotate to change the angle of the display portion 102 relative to the base portion 104). Various types of motion and/or articulations may be provided by the hinge mechanism 110, depending on the particular configuration of the hinge mechanism 110. For example, some hinge mechanisms 110 may produce a simple pivoting motion (e.g., about a single axis), while others may guide the display portion 102 along a more complex path, or allow other articulations or motions that are different than a simple pivot. Example hinge mechanisms 110 may include, for example, butt hinges, living hinges, barrel hinges, multi-link mechanisms, or the like. Various example hinge mechanisms are described herein.

Figure 2A:
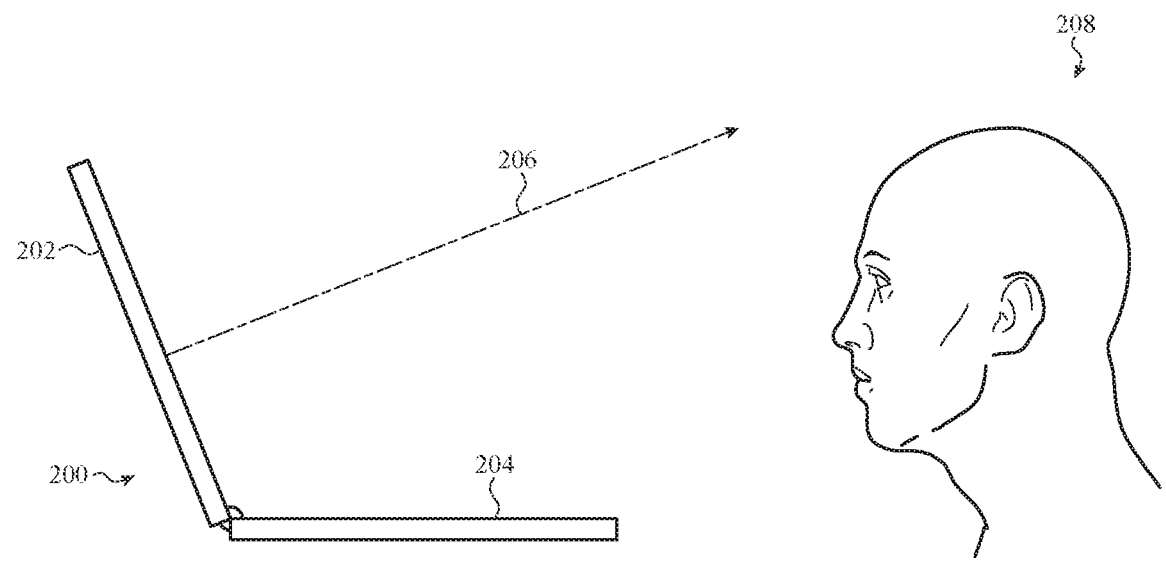
FIGS. 2A-2B depict an example electronic device in use.
Figure 2B:
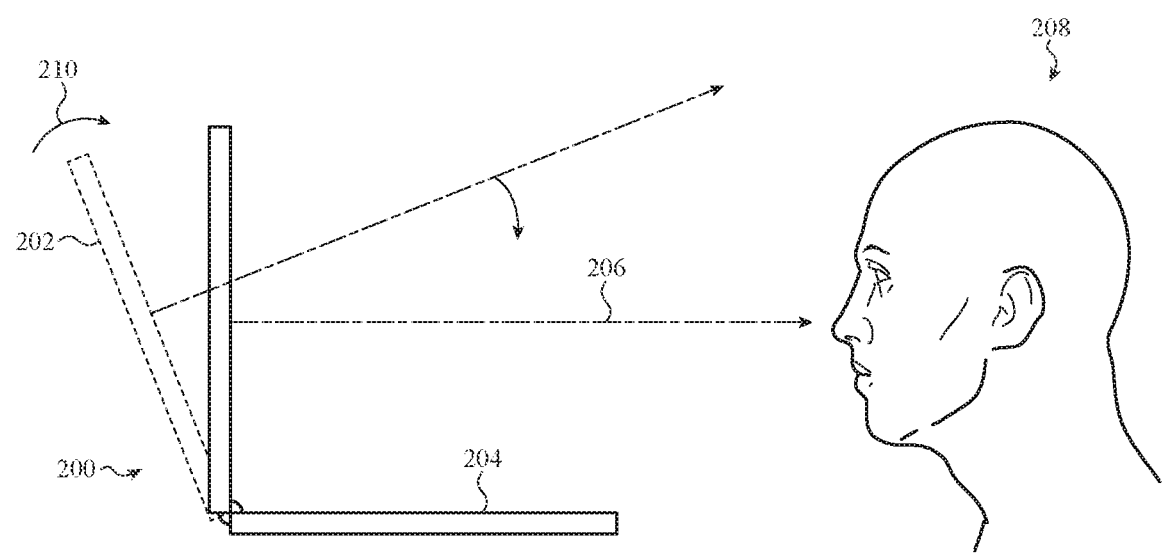

As described above, a user may experience the best performance from the display of a laptop computer when a target viewing vector of the display is directed towards the user's eyes. FIGS. 2A-2B illustrate this phenomenon and demonstrate how an automatic movement of the display portion relative to the base portion of a laptop computer can help reposition the display to improve the user's experience of the laptop.

FIG. 2A, for example, shows a laptop computer 200 in use by a user 208. The laptop computer 200 includes a display portion 202 movably coupled to a base portion 204. As shown in FIG. 2A, the target viewing vector 206 of the display is not directed at the user's eyes, but rather is pointing over the user's head. In this configuration, therefore, the user may not be experiencing the best display performance (e.g., the maximum or target visual characteristics of the display).

FIG. 2B illustrates how the display portion 202 can be moved (e.g., rotated) relative to the base portion 204 (as indicted by arrow 210) to cause the target viewing vector 206 to be pointed directly at the user's eyes. As described herein, the movement of the display portion 202 may be automatic, and may be performed in response to the laptop 200 determining that the display portion 202 is not positioned in an ideal or desired position relative to the user 208.

As shown in FIGS. 2A-2B, the target viewing vector 206 is shown as a vector that extends at a perpendicular angle from the centroid of the display. This is merely one example target viewing vector, however. Indeed, different displays may have different target viewing vectors. For example, some displays may have a target viewing vector extending at a non-perpendicular angle, and/or extending from a location other than the centroid of the display. Further, some displays may have a range of target viewing vectors. In such cases, the single target viewing vector used for illustration herein may correspond to a single vector within (and/or that is characteristic of) the range of target viewing vectors. The target viewing vector may be the vector (or range of vectors) along which a set of target graphical parameters may be achieved. The target graphical parameters may correspond to particular values of graphical parameters of the display such as brightness, contrast, color fidelity, or the like. In some cases, the target graphical parameters may be those which provide a best, preferred, or otherwise desired viewing experience. For example, the target graphical parameters may be a brightness of the display. Accordingly, the target viewing vector may be one that, when directed at a user's eyes, results in the highest perceived brightness of the display.

While FIGS. 2A-2B describe that the target position for the display portion may be a position that results in a target viewing vector pointing at a user's eyes, this is merely one example way to characterize the target position of the display portion, and there may be other ways of characterizing the ideal or target position of a display relative to a user. For example, the maximum perceived or objective display performance may be achieved when the display is viewed at particular viewing angle, where the viewing angle may be defined as an angle between the surface of the display and the gaze direction of a user (e.g., line extending from the user's eyes to the location on display at which the user is looking). In either case, the target position of the display may be the position at which the target or desired viewing angle is achieved, and/or the position at which the viewing vector of the display is directed at the user's eyes.

The device 100 may be configured to determine its target position in various ways and using various different sensing systems. For example, FIGS. 3A-3D illustrate an example in which an optical sensing system such as a camera is used to determine the position of the user relative to the display portion in order to determine the target position of the display portion.

Figure 3A:
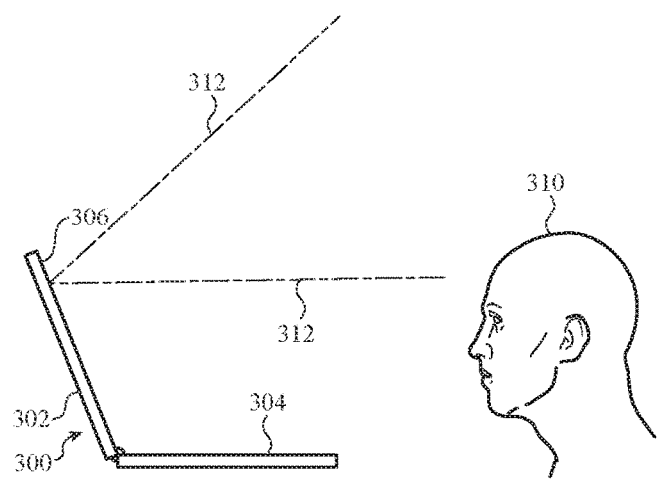
FIGS. 3A-3D depict a technique for determining a position of a user relative to a device.

More particularly, FIG. 3A shows a device 300 with a display portion 302 movably coupled to a base portion 304 via a hinge mechanism, and including an actuation system that is configured to move the display portion 302 relative to the base portion 304. The device 300 also includes a camera 306 (e.g., an example optical sensing system) that is configured to capture an image of an object such as a user 310. The camera 306 may have a field of view 312, generally capturing images of objects that are in front of the display portion 302.

Figure 3B:
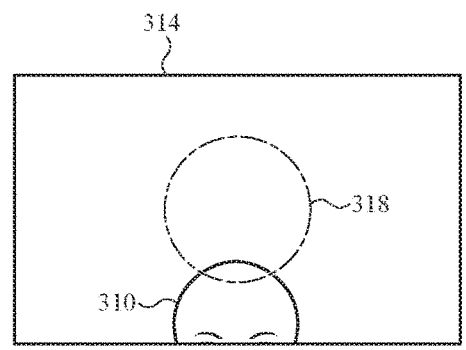

FIG. 3B shows an example image 314 captured by the camera 306 when the device 300 and the user 310 are positioned as shown in FIG. 3A. In the image 314, the user 310 (or the portion of the image 314 that corresponds to the user or contains the image of the user) is offset from a target user location 318. The target user location 318 may be a location in the image 314 that, if the user 310 is positioned at that location, will result in the display portion 302 being at the target position relative to the user 310. Thus, the device 300 may determine the offset or difference between the image of the user 310 and the target user location 318, and use the offset to determine the target position of the display portion 302. The device 300 may use other information in addition to (or instead of) the offset to determine the target position, such as a distance between the display portion 302 and the user 310 (as determined or estimated by the camera 306).

Figure 3C:
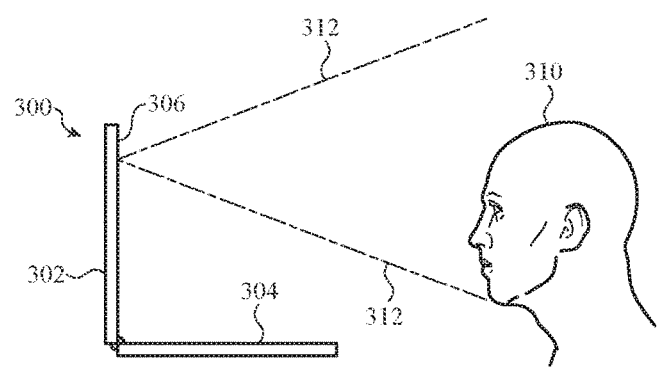
Figure 3D:
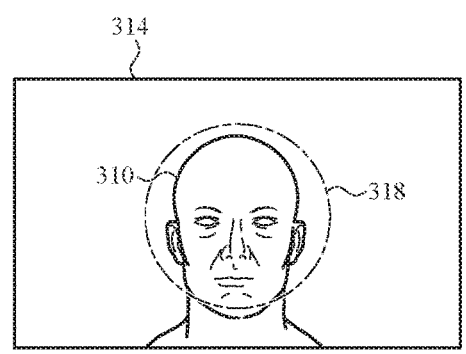

FIGS. 3C and 3D illustrate the device 300 after the display portion 302 has been moved from its initial position (FIG. 3A) to its target position. In particular, the display portion 302 has been rotated, pivoted, or otherwise moved towards the base portion 304 (e.g., towards a closed position) until the user 310 (e.g., the user's face) is positioned at the target user location 318, as shown in FIG. 3D.

FIGS. 3A-3D illustrate a target user location 318 as an area (e.g., a circle), and illustrates the display portion 302 moving so as to position the user's face in the target user location 318. However, in other examples the target user location and the portion of the user that the device attempts to position in the target user location may be different. For example, in some cases the device may move the display portion 302 such that the user's eyes or nose are positioned at a particular location or location(s) in the image. Further, FIGS. 3A-3D illustrate the target user position in the center of the image 314, however, the target user position may be any position in the image 314 that will result in the user being positioned at the intended location relative to the display portion 302. The actual target user position may depend on factors such as the target viewing vector or viewing angle of the particular display, the positioning or aim of the camera 306, the field of view of the camera 306, or the like.

Figure 4A:
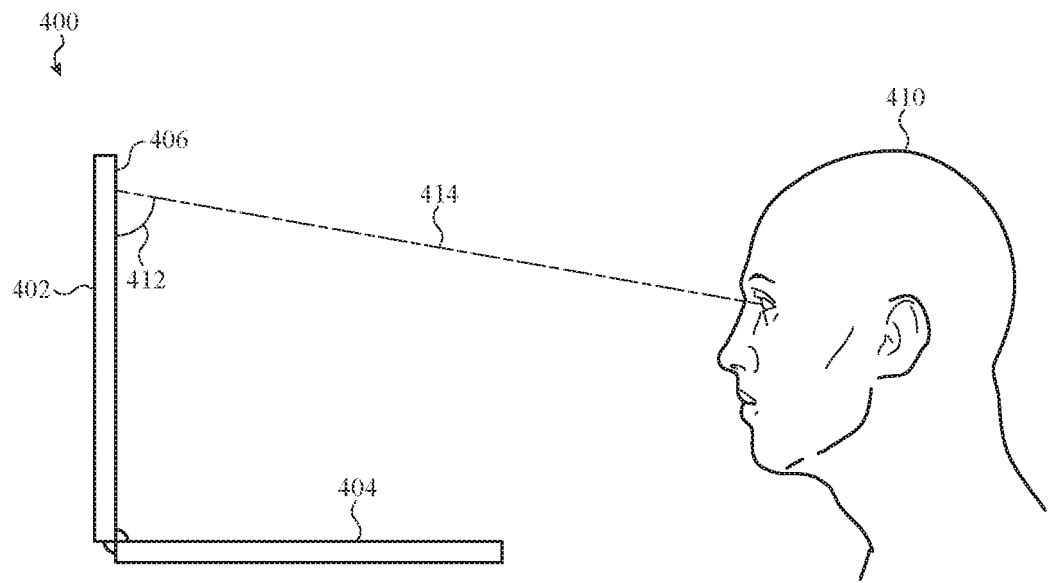
FIGS. 4A-4D depict a technique for adjusting a display portion based on a gaze direction of a user.

FIGS. 4A-4D illustrate how a device may adjust the position of its display portion based on a gaze direction of a user. For example, FIG. 4A illustrates a device 400 with a display portion 402 movably coupled to a base portion 404 via a hinge mechanism, and including an actuation system that is configured to move the display portion 402 relative to the base portion 404. The device 400 also includes an optical sensing system 406 that is configured to determine a gaze direction of a user 410. The gaze detecting optical sensing system 406 may include a projector configured to project a pattern of light onto the user 410, and a sensor configured to sense at least a portion of the pattern of light that is reflected by the user 410. The projector may project a pattern of infrared dots, for example, and the sensor may be configured to detect the portion of the infrared dots that are reflected by the user 410. The optical sensing system 406 may also include one or more lenses or other optical components that focus images onto the sensor.

FIG. 4A illustrates the user 410 with a gaze direction 414, resulting in a viewing angle 412. The viewing angle 412 may be defined as an angle between the gaze direction 414 and a plane defined by the display portion 402 (e.g., the plane defined by the main viewing surface of the display portion 402). The device 400 may determine that, based on the gaze direction 414, the viewing angle 412 is suboptimal, and/or that a different viewing angle would give the user a better viewing experience. Accordingly, the device 400 may determine a target position for the display portion 402 based at least in part on the gaze direction 414 of the user, and, as illustrated in FIG. 4B, cause the display portion 402 to be rotated or otherwise moved relative to the base portion 404 from the initial position to the target position (as illustrated by arrow 418, FIG. 4B).

Figure 4B:
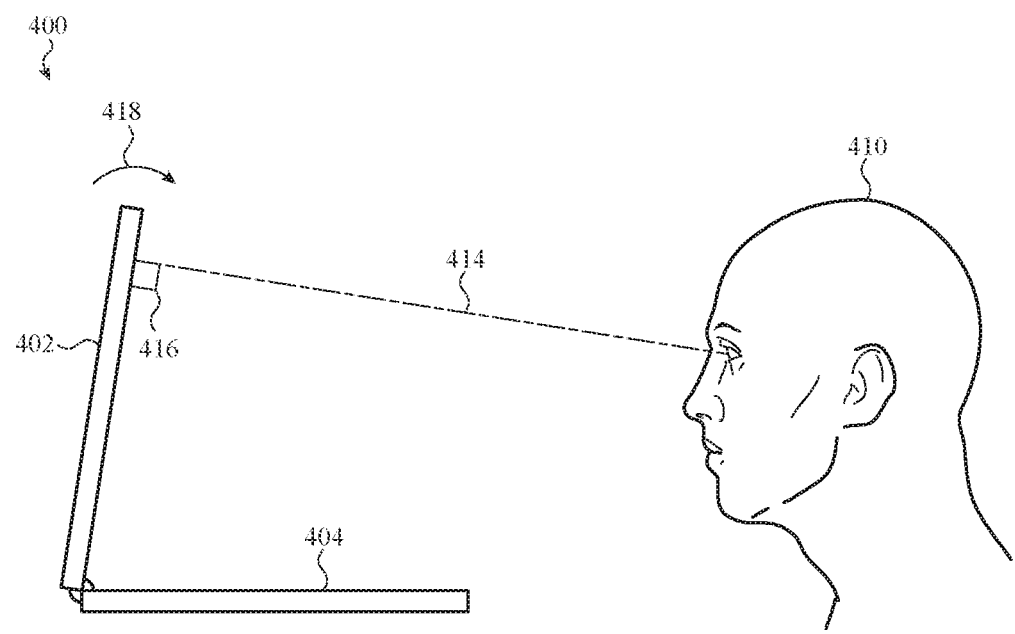

FIG. 4B illustrates the device 400 with the display portion 402 having been moved so that the user's gaze direction 414 has a target or intended viewing angle 416 relative to the area of the display portion 402 that the user is looking at. While FIG. 4B shows the target or intended viewing angle as being perpendicular to the display portion 402, this is merely an example, and the target or intended viewing angle may be a different angle (e.g., the angle at which the user will experience the best display performance).

Figure 4C:
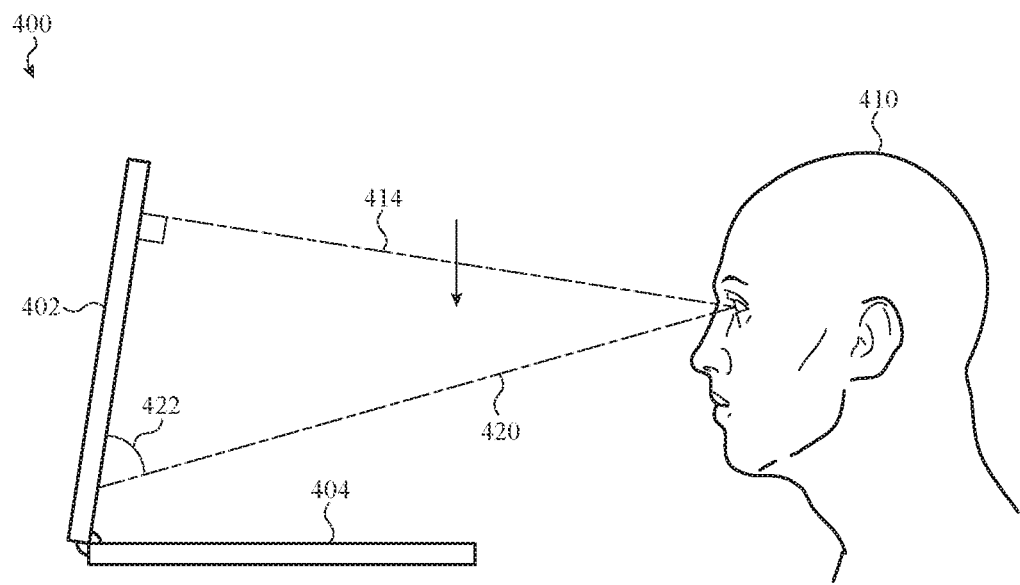
Figure 4D:
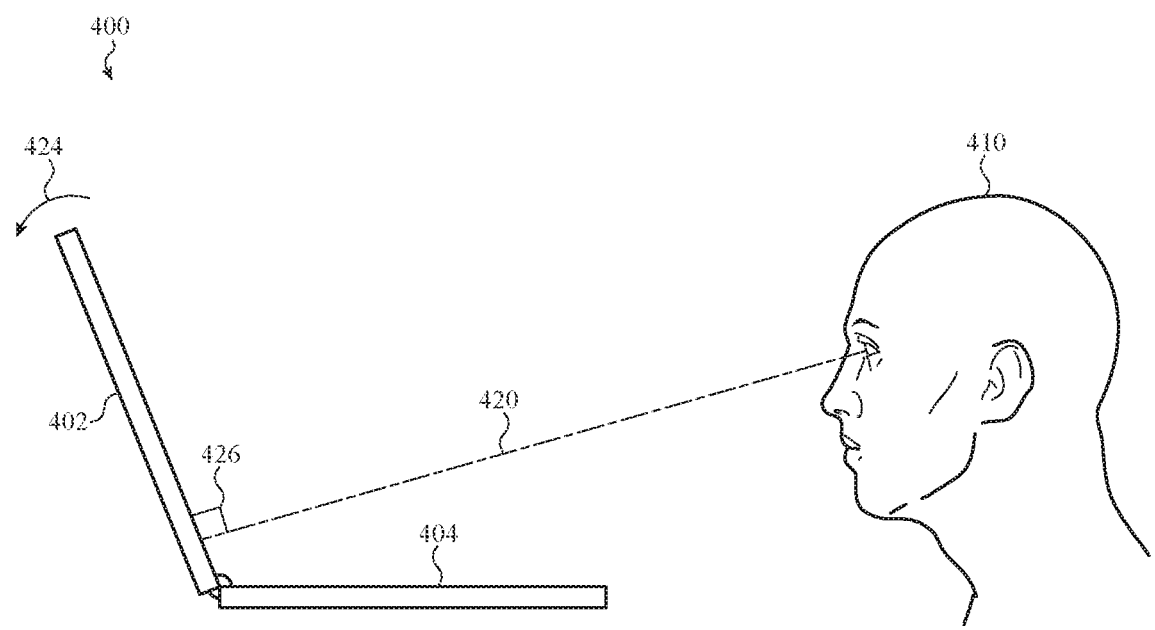

If the user 410 changes his or her gaze direction, the device 400 may once again determine the user's gaze direction and adjust the display portion 402 accordingly. FIG. 4C, for example, illustrates the condition where the user 410 has moved his or her gaze from the top of the display portion 402 (as illustrated in FIGS. 4A-4B) to a bottom of the display portion 402. As such, the viewing angle 422 is no longer equal to the target or intended viewing angle. The device 400 may determine the user's gaze direction 420, determine a target position for the display portion based at least in part on the gaze direction 420, and cause the display portion 402 to be rotated or otherwise moved relative to the base portion 404 to the target position shown (e.g., as illustrated by arrow 424, FIG. 4D). FIG. 4D, for example, shows the display portion 402 having moved so that the user's gaze direction 420 is perpendicular to the area of the display portion 402 that the user is looking at (e.g., the viewing angle 426 is perpendicular).

Adjusting the display portion based on the gaze of a user may be performed instead of or in addition to adjusting the position based on the position of a user's face relative to the viewing vector of the screen (e.g., as shown in FIGS. 3A-3D). For example, in some cases, the device may perform an operation such as that illustrated in FIGS. 3A-3D so that the viewing vector of the display is directed at the user's face or eyes. The device may then perform an operation such as that illustrated in FIGS. 4A-4D to fine tune the position of the display portion based on where on the screen the user is actually looking.

The techniques of moving a display portion based on a physical disposition of a user (e.g., the position of the user's face relative to the viewing vector of the screen, the user's gaze direction, etc.) may be performed at various frequencies and/or in response to various triggering conditions. For example, in some cases such techniques may be performed cyclically or continually, such that the display portion continually tracks, in real time, the user and/or the user's gaze and changes the position of the display portion as necessary to maintain the display portion in a target position. In other cases, the device performs such techniques in response to a particular triggering event, such as a user command, or when the user opens or turns on a laptop computer for use, or at a predetermined frequency (e.g., every 10 seconds, 30 seconds, 1 minute, 2 minutes, or the like).

Figure 5A:
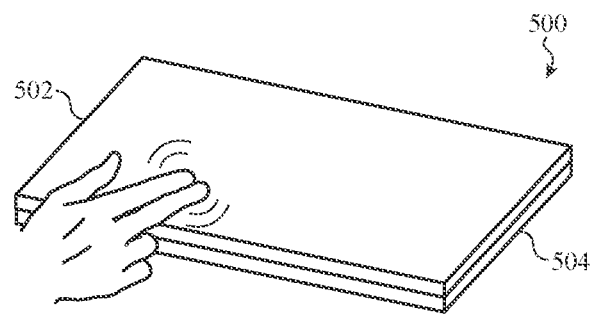
FIGS. 5A-5C depict a technique for automatically opening a device.
Figure 5B:
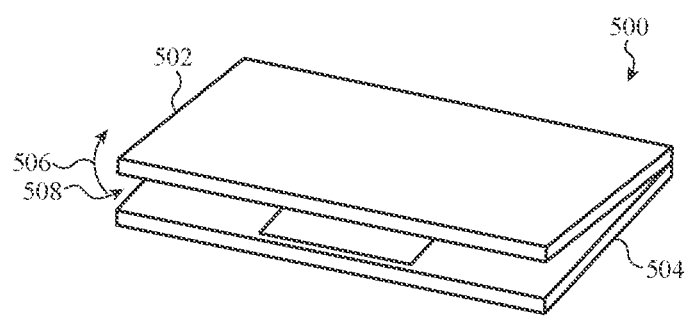
Figure 5C:
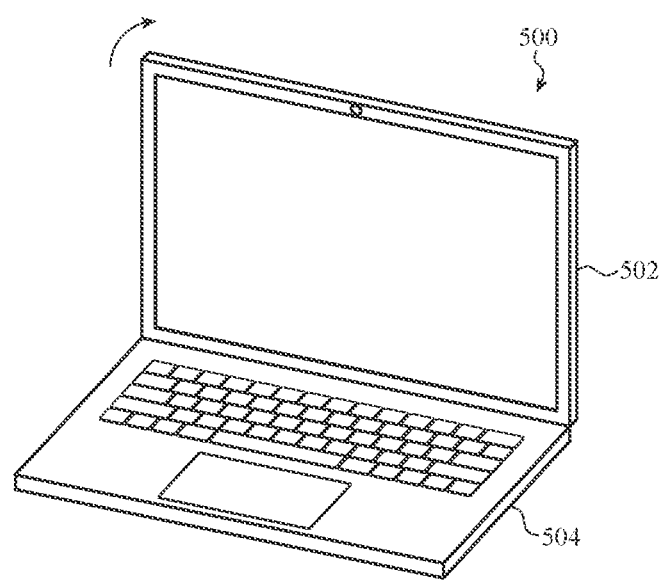

An actuation system that can rotate or move the display portion of a device relative to a base portion may facilitate functions other than repositioning a display to improve its graphical or visual performance. FIGS. 5A-5C, for example, illustrate how the actuation systems described herein may be used to assist in the opening and/or closing of a laptop computer (or other device with a display portion (or lid) movably coupled to a base portion). The actuation systems described herein may actuate a hinge mechanism or other coupling in order to move the display portion.

FIG. 5A illustrates a device 500, such as a laptop computer, with a lid or display portion 502 and a base portion 504. The device 500 also includes an actuation system that is configured to move the display portion 502 relative to the base portion 504. The actuation system may use shape-memory alloy materials to provide the force to move the display portion 502, as described herein.

As shown in FIG. 5A, the device 500 is in a closed configuration (e.g., with the display portion 502 folded against the base portion 504). Upon detecting a command or input from a user, the device 500 may cause the actuation system to move the display portion 502 from the closed position to an open position. For example, the device 500 may include a touch sensitive input system that is configured to detect an input such as a tap, touch, press, on the device 500. As shown in FIG. 5A, a user taps or touches the exterior surface of the display portion 502 to request that the display portion 502 be opened or lifted. The device 500 detects the input from the user, and in response, causes the actuation system to move or rotate the display portion 502 towards the open position, as indicated by arrow 506 in FIG. 5B. The touch sensitive input system may include any suitable sensing technology or systems to detect touches, taps, gestures, or the like. For example, the touch sensitive input system may include a capacitive touch sensing system that detects touch inputs applied to the display portion 502. As another example, the touch sensitive input system may include an accelerometer that can detect a tap or other impact on the device 500. Other types of input systems may also be used to facilitate the detection of inputs to cause the display portion 502 to open, including but not limited to buttons, keys, force sensors, optical sensors (e.g., to detect touchless gestures like hand waves), audio sensors (e.g., to detect voice commands), or the like.

In response to detecting the input to open the device 500, the display portion 502 may move to a partially opened position or a fully opened position. For example, the actuation system may move the display portion 502 to a partially open position to reveal a gap 508, as shown in FIG. 5B. The gap 508 may provide access to an edge of the display portion 502 so that the user can grasp or otherwise contact the edge of the display portion 502 to manually open the display portion 502 further. The gap 508 may be a distance (between the facing surfaces of the display portion 502 and base portion 504) of about 5 mm, about 10 mm, about 15 mm, about 20 mm, about 25 mm, about 30 mm, or any other suitable distance. In some cases, the device 500 may be configured to move the display portion 502 further to a fully open position, as shown in FIG. 5C. Once the display portion 502 is in an open position, the device 500 may use the actuation system to adjust the positioning of the display portion 502 using the techniques described above.

Figure 6A:
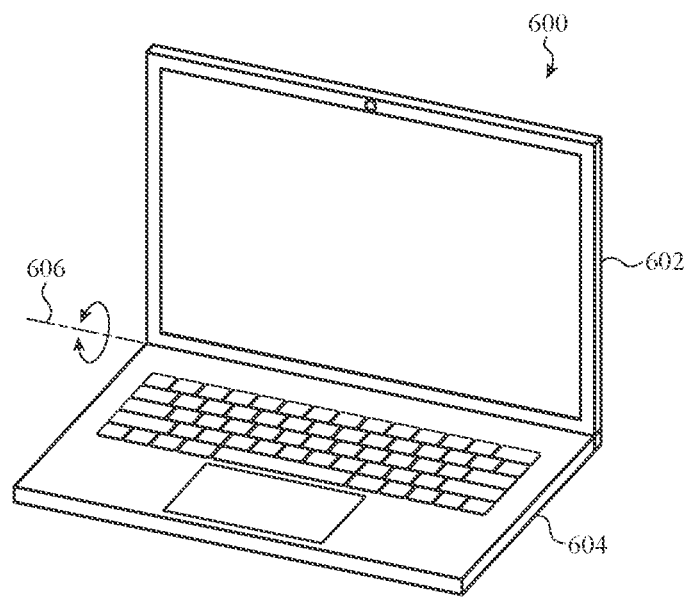
FIGS. 6A-6B depict another example electronic device.
Figure 6B:
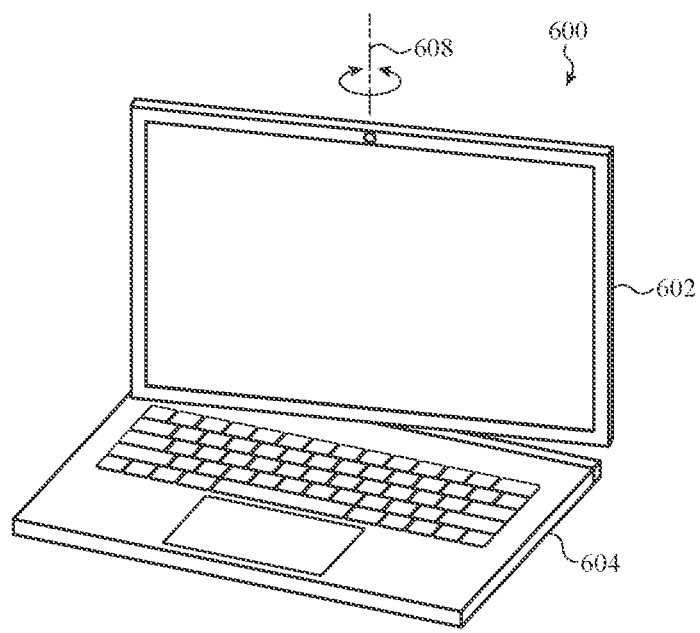

The foregoing examples describe motion of a display portion about only a single axis (e.g., along an opening/closing direction of the display portion relative to the base portion). However, some devices may include hinge mechanisms and actuation systems that facilitate motion about multiple axes. For example, FIGS. 6A-6B illustrate a device 600 that can move a display portion 602 about multiple axes relative to a base portion 604. More particularly, the device 600 may include a first hinge mechanism and first actuation system that facilitates motion about a first axis 606, as shown in FIG. 6A. The device 600 may also include a second hinge mechanism and second actuation system that facilitates motion about a second axis 608, as shown in FIG. 6B. The device 600 may use the same or similar techniques described with respect to FIGS. 2A-4D to control the rotation or movement of the display portion 602 about the second axis 608. For example, the display portion 602 may rotate about the second axis 608 in order to achieve a target viewing angle and/or to orient the viewing vector of the display portion 602 towards a user's eyes.

As noted above, devices using the techniques described herein may include hinge mechanisms that movably couple display portions to base portions, and actuation systems coupled to the base portion and the display portion and configured to move the display portion relative to the base portion by actuating the hinge mechanisms. The actuation systems may use shape-memory alloy (SMA) materials to provide the motive force to move the display portions relative to the base portions. Shape-memory alloy (SMA) materials change shape (e.g., expand or contract) based on their temperature. Thus, for example, an electrical current or electrical signal applied to an SMA material may heat the SMA material, thus causing the SMA material to change shape. Allowing the SMA material to cool (either via passive or active cooling) may also result in the SMA material changing shape. Accordingly, by controlling the temperature of the SMA material, the actuation system may cause the display portion of the laptop computer to move in an intended direction. Examples of SMA materials include copper alloys (e.g., copper-aluminum-nickel), nickel alloys (e.g., nickel-titanium), zinc alloys (e.g., copper-zinc-aluminum), cobalt alloys (e.g., cobalt-nickel-gallium alloys), silver alloys (e.g., silver-cadmium), titanium alloys (e.g., titanium-niobium), gold alloys (e.g., gold-cadmium), iron alloys, and other alloy materials.

Figure 7A:
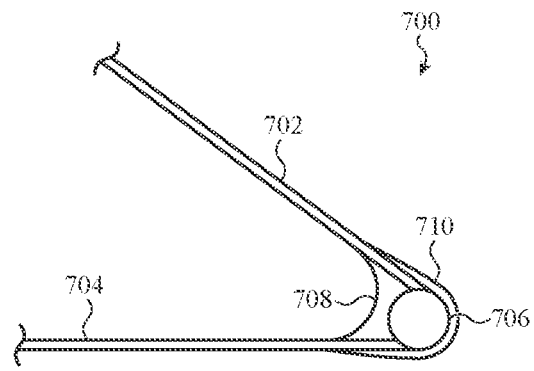
FIGS. 7A-7C depict example shape-memory alloy members for moving a display portion of a device.
Figure 7B:
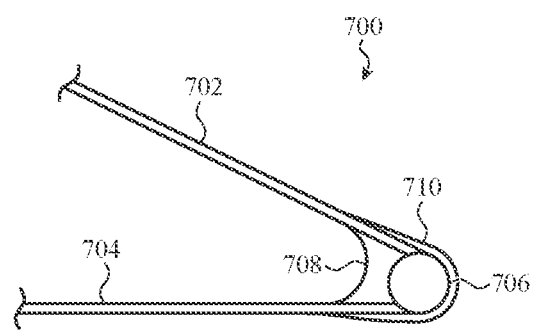
Figure 7C:
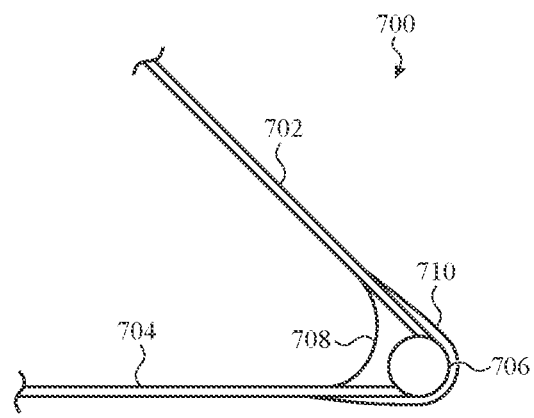

Actuation systems may implement SMA materials in various ways to move a display portion relative to a base portion. FIGS. 7A-7C illustrate how members formed from SMA materials (referred to as shape-memory alloy members or SMA members) may be implemented with a hinge mechanism to move a display portion of a device 700. For example, FIG. 7A illustrates a display portion structure 702 movably coupled to a base portion structure 704 via a hinge mechanism 706. The display portion structure 702 and the base portion structure 704 represent a structure or component of the display portion and the base portion, respectively, to which SMA members may be attached to provide the force for moving the display portion of a device relative to a base portion. For ease of representation, the display portion structure 702 and the base portion structure 704 are illustrated as simple members, though actual devices may use different (e.g., more complex) components or structures to anchor to the SMA members. Further, the hinge mechanism 706 represents any suitable hinge, linkage, or other structure or system that movably couples a display portion to a base portion. While FIGS. 7A-7C illustrate two SMA members, more or fewer SMA members may be used. For example, multiple SMA members may be used to provide an intended or target amount of force.

A first SMA member 708 may be coupled to the display portion structure 702 and the base portion structure 704 on a first side of the hinge mechanism 706, and a second SMA member 710 may be coupled to the display portion structure 702 and the base portion structure 704 on a second side of the hinge mechanism 706. By positioning the SMA members 708, 710 on opposite sides of the hinge mechanism 706, or more particularly on opposite sides of a physical or virtual pivot point defined by the hinge mechanism, the SMA members 708, 710 can move the display portion structure 702 in opposite directions about the hinge mechanism 706. For example, by passing an electrical current through the first SMA member 708, the first SMA member 708 may be caused to heat and therefore contract. Because the first SMA member 708 is anchored to the display and base portion structures (and because of the position of the first SMA member 708 relative to the hinge mechanism 706 and/or pivot point), the contraction will produce a first force that will cause the display portion structure 702 to move towards the base portion structure 704. FIG. 7B illustrates the display portion structure 702 after contraction of the first SMA member 708, showing the display portion structure 702 having moved towards a closed position.

By passing an electrical current through the second SMA member 710, the second SMA member 710 may be caused to heat and therefore contract. Because the second SMA member 710 is anchored to the display and base portion structures (and because of the position of the second SMA member 710 relative to the hinge mechanism 706 and/or pivot point), the contraction will produce a second force causing the display portion structure 702 to move away from the base portion structure 704 (e., in a second direction opposite the first direction). FIG. 7C illustrates the display portion structure 702 after contraction of the second SMA member 710, showing the display portion structure 702 having moved towards an open position.

In some cases, the SMA members 708, 710 are not actuated (e.g., having electrical current passed therethrough) at the same time, thereby avoiding unnecessary application of opposing forces. In other cases, however, the SMA members 708, 710 may be actuated at the same time. For example, one SMA member may be actuated in order to help control the motion of the display portion, or to provide a retention force that prevents or inhibits motion of the display portion.

In some cases, instead of using SMA members to provide both opening and closing forces, a lid portion may be biased towards an open or closed position, and one or more SMA members may be used to provide a selective opening or closing force that opposes the biasing force. As one example, with reference to FIG. 7A, the first SMA member 708 may be omitted, and a biasing mechanism may be provided that biases the display portion structure 702 towards the closed position. The second SMA member 708 may be selectively actuated (e.g., to expand or contract the second SMA member 708) to move the display portion. Once the display portion is positioned at a target position, the second SMA member 708 may produce a force that is substantially equal to the biasing force, thereby maintaining the display portion in the target position. Similar techniques may be applied in cases where the second SMA member 708 is omitted, and the display portion is biased towards the open position.

Biasing forces may be generated in any suitable way. For example, a biasing member such as a spring or elastic component may provide a biasing force. A biasing member may be integrated with a device in various ways. For example, a biasing member may be integrated with a hinge mechanism. As another example, a biasing member may be attached to a display portion structure and a base portion structure in a manner similar to the first or second SMA members in FIGS. 7A-7C.

Actuation systems using SMA members may also use position feedback systems to determine the actual position of the display portion relative to the base portion of a device. The position feedback systems may include encoders (e.g., optical encoders), resolvers, Hall effect sensors, potentiometers, or any other suitable system or mechanism. In some cases, the SMA material itself may be used to determine the actual position of a display portion relative to the base portion. For example, a property of the SMA material (e.g., electrical resistance, temperature, etc.) may vary in accordance with the change in position of the display portion. By monitoring and/or detecting the value of the property, the device may determine the position of the display portion. Position feedback information may be used by a device as part of a control scheme for controlling the movement of the display portion. For example, a device may implement a closed-loop position control scheme, which may use the position information from the position feedback system, to cause the display portion to be moved to a target position.

As noted above, SMA members may be used in conjunction with various different types of hinge mechanisms to provide forces to open and/or close a display portion of a device. For example, a laptop computer may include a butt hinge to produce a pivoting motion about a single axis. In such cases, SMA members may be integrated with the device in a manner similar to that shown in FIGS. 7A-7C (e.g., with SMA members positioned on opposite sides of the pivot axis). FIGS. 8A-10C illustrate additional examples of hinge mechanisms that may be used with SMA members to provide the functionality described herein.

Figure 8A:
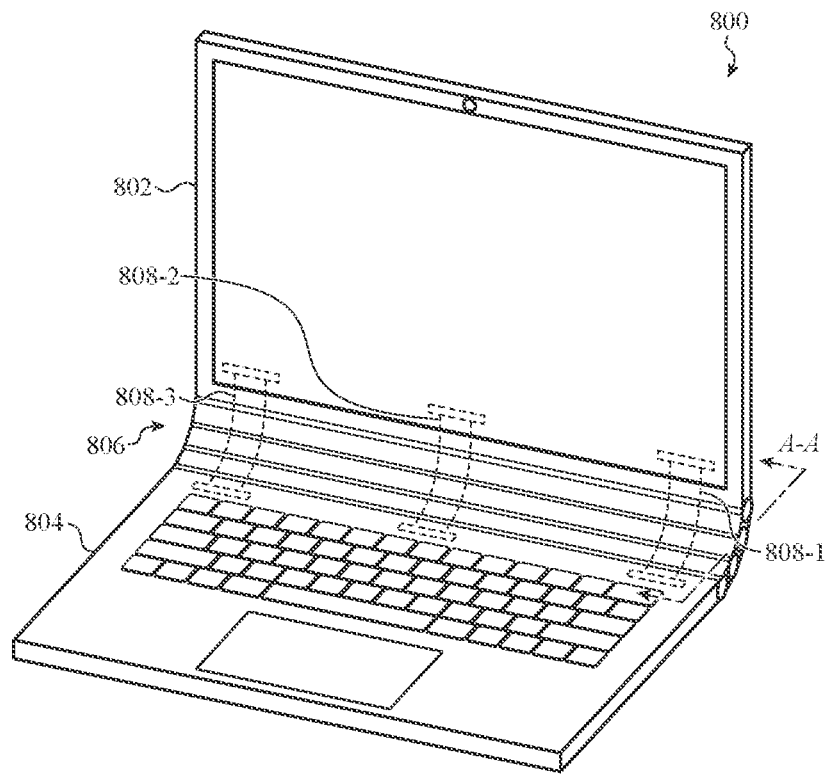
FIGS. 8A-8B depict an example electronic device with a hinge mechanism.

FIG. 8A illustrates an example device 800 (e.g., a laptop computer) with a multi-part hinge mechanism 806 movably coupling a display portion 802 to a base portion 804. The device 800 includes actuation systems 808 (e.g., actuation systems 808-1, 808-2, 808-3) that are coupled to the base portion 804 and the display portion 802 and configured to move the display portion 802 relative to the base portion 804. The actuation systems 808 may include SMA members to provide forces to move the display portion 802 according to the techniques described herein. For example, the SMA members may be configured to articulate the hinge mechanism 806, thereby moving the display portion 802 towards an opened or a closed position.

As shown, the device 800 includes multiple actuation systems 808. The actuation systems 808 may cooperate with one another to produce the forces and motion for moving and/or actuating a display portion, and as such multiple actuation systems may be referred to together as a single actuation system.

Figure 8B:
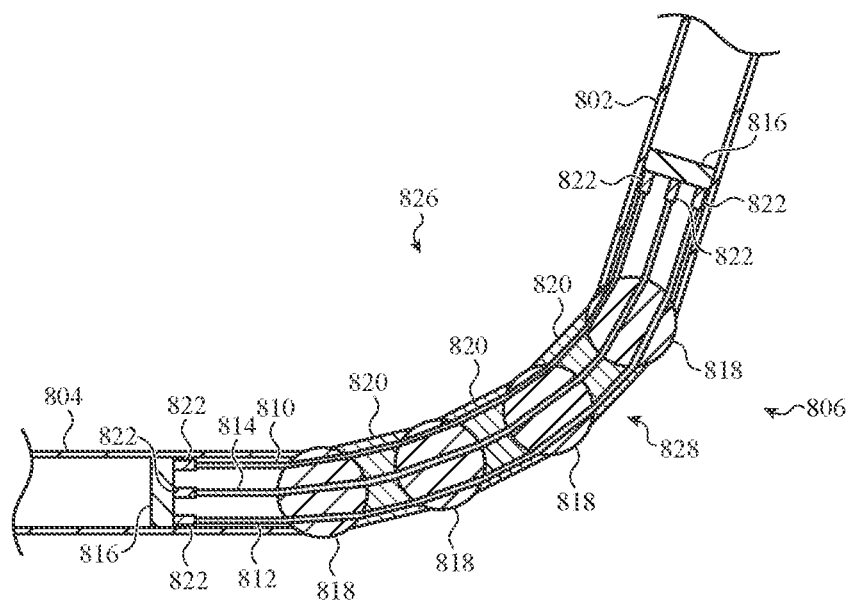

FIG. 8B is a partial cross-sectional view of the device 800, viewed along line A-A in FIG. 8A. The hinge mechanism 806 may include roller elements 818 and spacer elements 820. The roller elements 818 are engaged with (e.g., in contact with) curved surfaces of the spacer elements 820 and are configured to rotate along the curved surfaces of the spacer elements 820. The relative motion between the roller elements 818 and spacer elements 820 allows the hinge mechanism 806 to articulate so that the display portion 802 can move relative to the base portion 804.

The actuation systems 808 may be integrated with the hinge mechanism 806 to provide the motive forces for moving the display portion 802. For example, as shown in FIG. 8A, the actuation systems 808 may include a first SMA member 810 and a second SMA member 812. The first and second SMA members 810, 812 may be retained to the display portion 802 and the base portion 804 via anchors 816. The anchors 816 may be any suitable structure, component, or mechanism that physically and/or structurally retains the first and second SMA members 810, 812 to the display portion 802 and the base portion 804. For example, the anchors 816 may be a feature of a unitary frame or housing member of the device 800 (e.g., a flange, wall, lug, or the like, formed from the same piece of material as the frame or housing member). Anchors 816 may be sufficiently strong to withstand the forces applied to them by the SMA members when the SMA members are imparting forces onto the anchors 816 for moving the display portion 802. The anchors 816 may retain the ends of the SMA members 810, 812 via clamps, screws, bolts, fasteners, or any other suitable mechanism.

Electrical connection lugs 822 may be conductively coupled to the first and second SMA members 810, 812. The electrical connection lugs 822 may facilitate a conductive coupling between a power source (which may be controlled by a processing system of the device 800) and the first and second SMA members 810, 812. Electrical current may be passed through the first and second SMA members 810, 812 via the electrical connection lugs 822. In some cases, the electrical connection lugs 822 may be load bearing components that structurally couple the first and second SMA members 810, 812 to the anchors 816. In some cases, the electrical connection lugs 822 may be conductively coupled to the first and second SMA members 810, 812, but may not be part of the load-path between the SMA members and the base portion 804 and display portion 802.

The first and second SMA members 810, 812 may extend through openings defined through the roller elements 818 and the spacer elements 820. As shown, the first SMA member 810 extends through openings that are proximate the concave (or inner) portion of the hinge mechanism 806, while the second SMA member 812 extends through openings that are proximate the convex (or outer) portion of the hinge mechanism 806. Stated another way, the first SMA member 810 is between a middle or neutral axis of the hinge mechanism 806 (which may correspond to the path of the middle member 814) and the inside curve 826, while the second SMA member 812 is between the middle of the hinge mechanism 806 and the outside curve 828.

The positions of the first and second SMA members 810, 812 relative to the middle (or neutral axis or location) of the hinge mechanism 806 define how actuation of the SMA members ultimately move the display portion 802. For example, as shown in FIG. 8B, the first SMA member 810 is analogous to the first SMA member 708 in FIGS. 7A-7C. When a current is passed through the first SMA member 810 (or the SMA member is otherwise heated), it may contract, thereby producing a force that moves the display portion 802 towards a closed position (e.g., reducing the radius of curvature of the hinge mechanism 806). On the other hand, because the second SMA member 812 is on the outer side of the hinge, when a current is passed through the second SMA member 812 (or it is otherwise heated), it will contract, thereby producing a force that moves the display portion 802 towards an open position (e.g., increasing the radius of curvature of the hinge mechanism 806).

The device 800 may also include an optional middle member 814, which may be retained to the base portion 804 and the display portion 802 via the anchors 816. The middle member 814 may also extend through openings formed in the roller elements 818 and the spacer elements 820. The middle member 814 may extend through or define a middle of the hinge mechanism 806. That is, the middle member 814 may extend along or define a path through the hinge mechanism 806 that does not significantly change length as the hinge mechanism 806 is articulated (e.g., as the display portion 802 is opened and/or closed).

The middle member 814 may provide a retaining force that holds the roller elements 818 and the spacer elements 820 together. For example, the middle member 814 may be coupled to a spring or other compliant structure (or the middle member 814 may be formed of a compliant material) that places the middle member 814 under tension, thereby pulling the roller elements 818 and the spacer elements 820 together. The middle member 814 may also be formed from an SMA material. In such cases, the retaining force provided by the middle member 814 may be dynamically changed by controlling the temperature of the middle member 814. For example, the tension in the middle member 814 may be increased when the display portion 802 is not being moved by the actuation systems 808 (or manually by a user). In particular, the increased tension may increase the frictional force between the roller elements 818 and the spacer elements 820, thereby inhibiting motion of the display portion and helping to retain it in a stable position. When the display portion 802 is being moved by the actuation systems 808, the device 800 may decrease the tension in the middle member 814 (e.g., by removing a current from the middle member 814 or otherwise cooling it), thereby reducing the frictional resistance in the hinge so that the first and second SMA members 810, 812 can move the display portion 802 with less force.

Figure 9A:
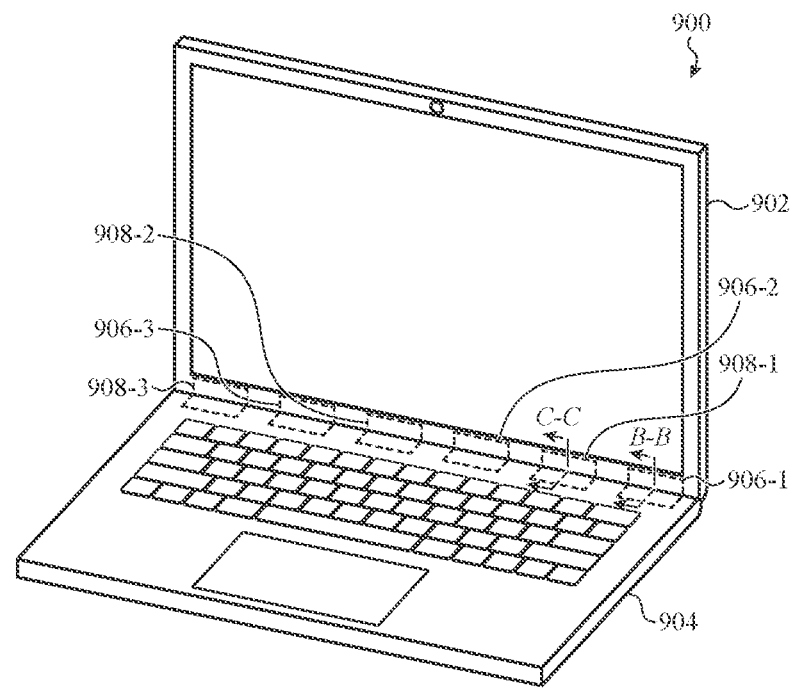
FIGS. 9A-9C depict another example electronic device with a hinge mechanism.
Figure 9B:
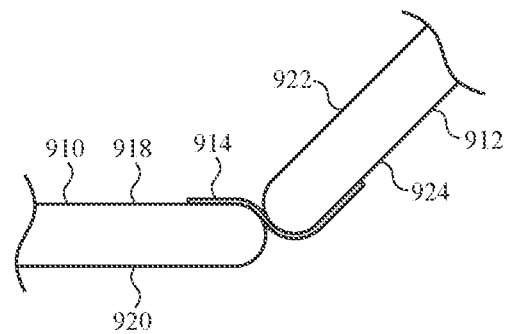
Figure 9C:
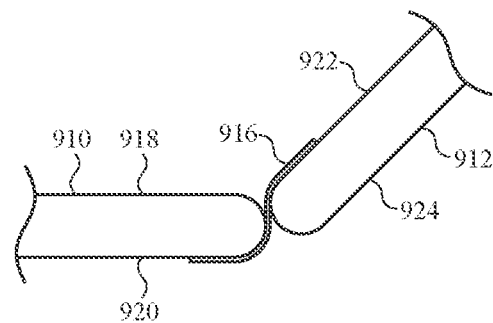

FIGS. 9A-9C illustrate another example hinge mechanism that may be used with SMA members to provide the functionality described herein. FIG. 9A illustrates an example device 900 (e.g., a laptop computer) with a display portion 902 movably coupled to a base portion 904. The device 900 includes first actuation systems 906 (e.g., 906-1, 906-2, 906-3) and second actuation systems 908 (e.g., 908-1, 908-2, 908-3) that are coupled to the base portion 904 and the display portion 902 and configured to move the display portion 902 relative to the base portion 904. The actuation systems 906, 908 may include SMA members to provide forces to move the display portion 902 according to the techniques described herein. The first and second actuation systems 906, 908 may cooperate with one another to produce the forces and motion for moving and/or actuating a display portion, and as such may be referred to collectively as an actuation system.

FIG. 9B is a partial cross-sectional view of the device 900, viewed along line B-B in FIG. 9A, illustrating a first actuation system 906. The first actuation system 906 may include a first SMA member 914 that is coupled to an inner side 918 of a structure 910 in the base portion 904, and an outer side 924 of a structure 912 in the display portion 902. The structures 910 and 912 may be structural components within or coupled to the base portion 904 and display portion 902, respectively, and may serve as anchors to retain the SMA members to the base portion 904 and display portion 902. The SMA members may be electrically coupled to a power source via lugs or another suitable connector. FIG. 9C is a partial cross-sectional view of the device 900, viewed along line C-C in FIG. 9A, illustrating a second actuation system 908. The second actuation system 908 may include a second SMA member 916 that is coupled to an outer side 920 of the structure 910, and an inner side 922 of the structure 912.

The first and second actuation systems may cooperate to produce forces that move the display portion 902. For example, if an opening motion is desired, the SMA members of the first actuation systems may be caused to contract (e.g., by passing a current through the first SMA members), while the SMA members of the second actuation systems may be caused to expand (e.g., by ceasing or reducing a current through the SMA members or cooling the second SMA members). These coordinated strains applied by the SMA members may produce a force that tends to open the display portion 902 relative to the base portion 904. By reversing the strains, (e.g., expanding the SMA members of the first actuation systems and contracting the SMA members of the second actuation systems), the opposite motion may be achieved.

The SMA members of the actuation systems in FIGS. 9A-9C may provide the force to move the display portion 902, and they may also retain the display portion 902 to the base portion 904. In some cases, other mechanisms, linkages, or other components may movably couple the display portion 902 to the base portion 904 and may help define the manner in which the display portion 902 moves relative to the base portion 904.

Figure 10A:
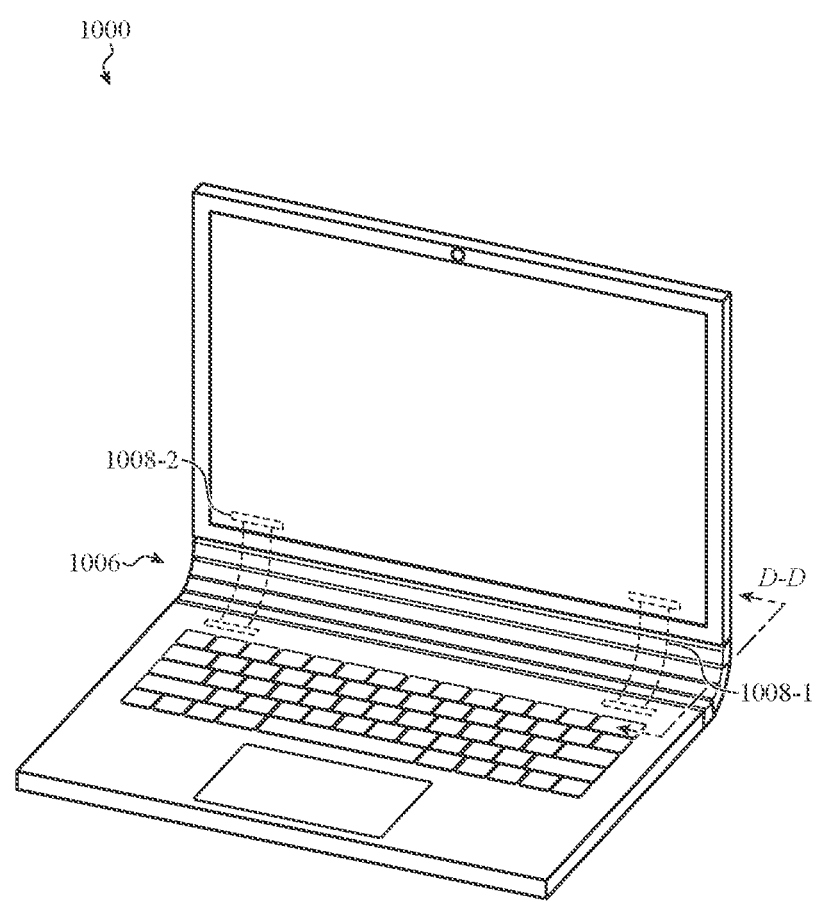
FIGS. 10A-10C depict another example electronic device with a hinge mechanism.
Figure 10B:
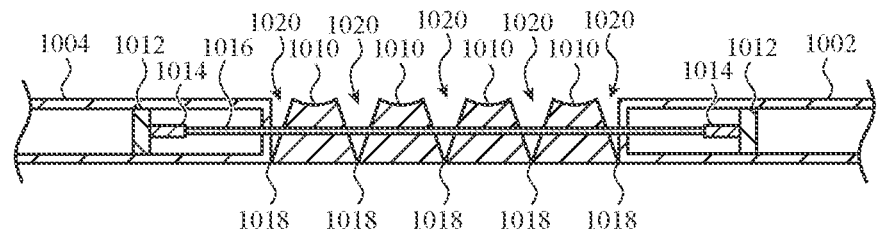
Figure 10C:
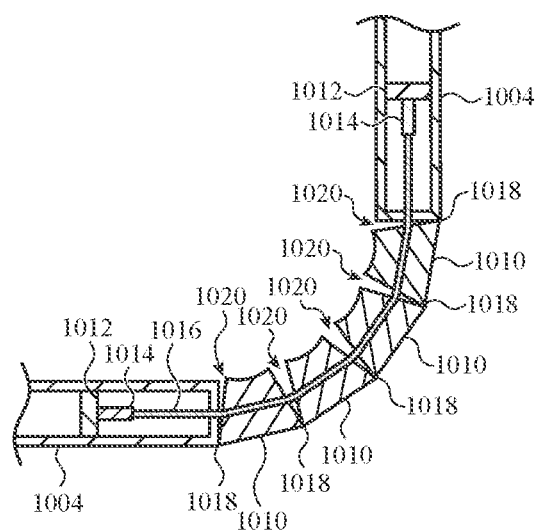

FIGS. 10A-10C illustrate another example hinge mechanism that may be used with SMA members to provide the functionality described herein. FIG. 10A illustrates an example device 1000 (e.g., a laptop computer) with a multi-part hinge mechanism 1006 movably coupling a display portion 1002 to a base portion 1004. The device 1000 includes actuation systems 1008 (e.g., actuation systems 1008-1, 1008-2) that are coupled to the base portion 1004 and the display portion 1002 and configured to move the display portion 1002 relative to the base portion 1004. The actuation systems 1008 may include SMA members that provide forces to move the display portion 1002 by articulating the hinge mechanism 1006 according to the techniques described herein. As shown, the device 1000 includes multiple actuation systems 1008. The actuation systems 1008 may cooperate with one another to produce the forces and motion for moving and/or actuating a display portion, and as such multiple actuation systems may be referred to together as a single actuation system.

FIG. 10B is a partial cross-sectional view of the device 1000, viewed along line D-D in FIG. 10A. The hinge mechanism 1006 may include beams 1010. The beams 1010 may be flexibly or articulatably coupled along an outside edge (e.g., location 1018). For example, the beams 1010 may each define complimentary gear teeth, or complimentary channels and protrusions that maintain the beams 1010 in engagement with one another while allowing them to pivot, rotate, or otherwise move relative to one another to facilitate the motion of the hinge mechanism 1006. As another example, the beams 1010 may be coupled together by a flexible fabric, polymer, or other material (including optionally a SMA material).

The actuation systems 1008 may be integrated with the hinge mechanism 1006 to provide the motive forces for moving the display portion 1002. For example, as shown in FIG. 10B, the actuation systems 1008 may include SMA members 1016. The SMA members 1016 may be retained to the display portion 1002 and the base portion 1004 via anchors 1012. The anchors 1012 may be any suitable structure, component, or mechanism that physically and/or structurally retains the SMA members 1016 to the display portion 1002 and the base portion 1004. For example, the anchors 1012 may be a feature of a unitary frame or housing member of the device 1000 (e.g., a flange, wall, lug, or the like, formed from the same piece of material as the frame or housing member). Anchors 1012 may be sufficiently strong to withstand the forces applied to them by the SMA member when the SMA member is imparting forces onto the anchors 1012 for moving the display portion 1002.

Electrical connection lugs 1014 may be conductively coupled to the SMA member 1016. The electrical connection lugs 1014 may facilitate a conductive coupling between a power source (which may be controlled by a processing system of the device) and the SMA member 1016. Electrical current may be passed through the SMA member 1016 via the electrical connection lugs 1014. In some cases, the electrical connection lugs 1014 may be load bearing components that structurally couple the SMA member 1016 to the anchors 1012. In some cases, the electrical connection lugs 1014 may be conductively coupled to the SMA member 1016, but may not be part of the load-path between the SMA member and the base portion 1004 and display portion 1002.

The SMA member 1016 may extend through openings defined through the beams 1010. As shown, the SMA member 1016 extends through openings that are positioned through the beam 1010 at a location where the beam has a reduced thickness (e.g., where a gap 1020 is defined between adjacent beams 1010). By positioning the SMA member 1016 at this location, contraction of the SMA member 1016 will result in the display portion 1002 being moved relative to the base portion 1004. For example, when a current is passed through the SMA member 1016 (or the SMA member 1016 is otherwise heated), it may contract. Because the beams 1010 are constrained against each other at the location 1018 proximate the outer side of the hinge mechanism, the contraction of the SMA member 1016 causes the radius of curvature of the overall hinge mechanism 1006 to reduce. FIG. 10C shows the device 1000 after the SMA member 1016 has contracted to move the display portion 1002 towards a closed position.

In order to move the display portion 1002 towards an open position (e.g., increasing the radius of curvature of the hinge mechanism 1006), the SMA member 1016 may be caused to extend. This may be achieved by reducing or removing an electrical current from the SMA member 1016, or actively or passively cooling the SMA member 1016. In some cases, a biasing mechanism may be provided that biases the display portion 1002 towards the open position. Accordingly, even when the SMA member 1016 is extended in length, it may remain under tension, due to the continuous application of the opening force from the biasing mechanism.

Figure 11A:
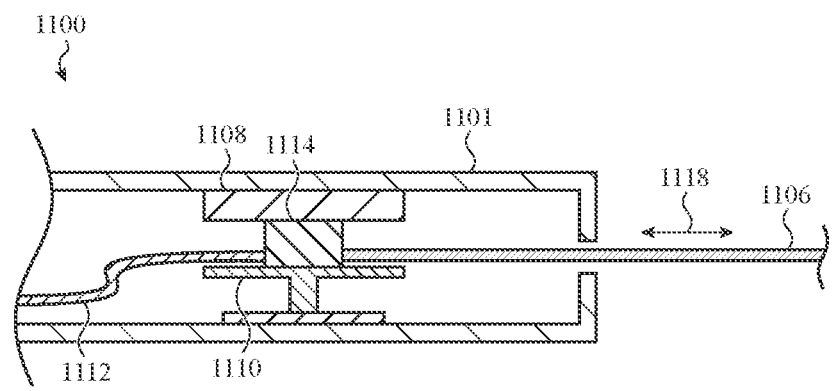
FIGS. 11A-11B depict a brake mechanism for use with a shape-memory alloy actuation system.
Figure 11B:
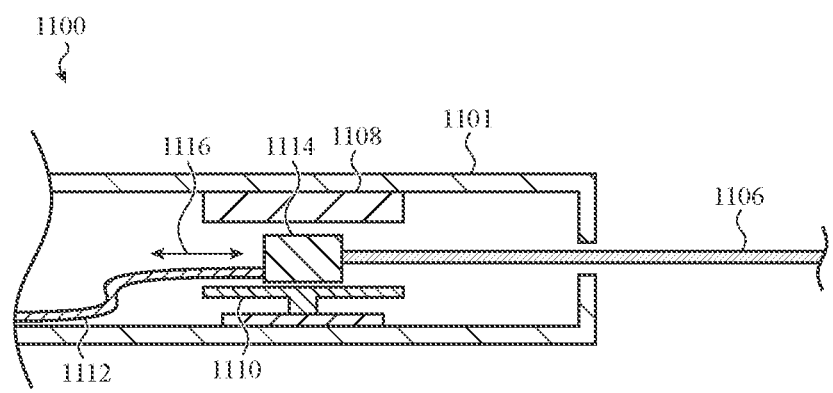

In some cases, SMA members as used herein may not change length enough to be able to move a display portion from a fully closed position to a fully open position. Accordingly, devices that use SMA members as described herein may include a brake that selectively inhibits or allows motion of the SMA members relative to the base portion and/or the display portion. The brake may be engaged when the SMA member is being used to control the motion of a display portion, and disengaged when the SMA member is not being used to control the motion of the display portion, such as when a user is moving the display portion to an open position or the user is moving the display further than the SMA member can stretch. FIGS. 11A-11B illustrate a partial cross-sectional view of an example base portion 1101 that includes an example brake 1100.

FIG. 11A illustrates the brake 1100 in an engaged configuration, in which a block 1114, which may be structurally and electrically coupled to an SMA member 1106, is being compressed between (or otherwise engaged by) brake elements 1108 and 1110. As shown, the brake element 1110 may be actuated or moved in order to force itself into engagement with the block 1114, and also to force the block 1114 into engagement with the brake element 1108. In some cases, both the brake elements 1108, 1110 move in order to engage the block 1114. When the brake 1100 is engaged as shown in FIG. 11A, the brake 1100 inhibits motion of the SMA member 1106 (via the block 1114, for example), thereby allowing shape or length changes of the SMA member 1106, to translate to movement of the display portion of a device (as illustrated by arrow 1118). Thus, for example, a device may engage the brake 1100 as shown in FIG. 11A to inhibit motion of the SMA member 1106 relative to the base portion 1101 while the SMA member 1106 is articulating a hinge mechanism (e.g., as described with respect to FIGS. 7A-10C) or otherwise moving the display portion.

FIG. 11B illustrates the brake 1100 in a disengaged configuration, in which the block 1114 is not being compressed between (or otherwise engaged by) brake elements 1108 and 1110. The brake 1100 may release the SMA member 1106 as shown in FIG. 11B, for example, when the lid portion of a computer is being moved from a fully closed to an open position (e.g., when a user opens a laptop computer). In this way, the SMA member 1106 can move substantially freely (as indicated by arrow 1116) so that the display portion can undergo large movements without being restricted by the SMA material or potentially damaging the SMA material.

Because the SMA member 1106 moves relative to the base portion 1101, a flexible electrical connector 1112 may electrically or conductively couple the SMA member 1106 to a power source and/or other control circuits or systems. The flexible electrical connector 1112 may include one or more flexible circuit boards, wires, cables, or any other suitable component.

A device may determine when to engage and disengage the brake based on various conditions. For example, a device may include sensors (e.g., touch-sensitive input systems) to determine when the user has contacted the device to open the display portion. Upon detecting that the user is opening the display portion, the device may disengage the brake. The device may re-engage the brake upon determining that the user is no longer contacting the display portion (and, optionally, that the display portion is no longer moving, and/or that it is in a position that is consistent with the device being used, such as about 90 degrees relative to the base portion). Once the device determines that the display portion is in an open position and/or is no longer being manually manipulated by the user, the device may re-engage the brake so that the SMA member can begin to control the position of the display portion.

While FIGS. 11A-11B describe a brake being positioned in a base portion, brakes may be positioned elsewhere in a device instead of or in addition to the base portion. For example, brakes may be positioned in both the display portion and the base portion, or only in the display portion, of a device.

Figure 12A:
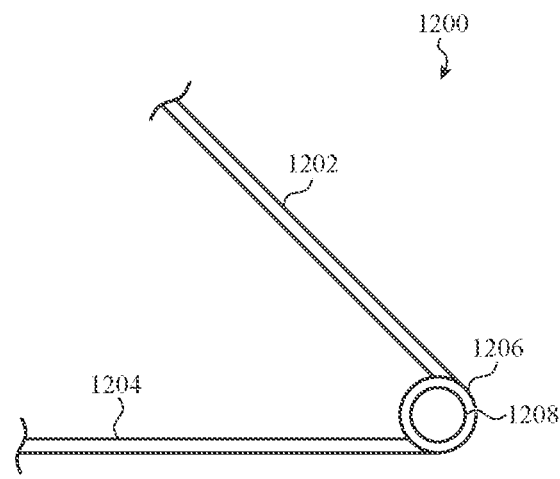
FIGS. 12A-12B depict electronic devices with motors for moving a display portion.

Actuation systems may include SMA materials (e.g., members formed from or including shape-memory alloys) to produce the motive forces that move a display portion of a device relative to a base portion. Actuation systems may also use other types of mechanisms, systems, or techniques to produce the motive forces. For example, FIGS. 12A-12B illustrate devices that use electric motors to provide the motive forces.

Electric motors may be integrated with devices in order to move the display portions in various ways. FIG. 12A illustrates an example device 1200 (e.g., a laptop computer), that includes a base portion 1204 and a display portion 1202 movably coupled to the base portion 1204. As shown, the display portion 1202 and the base portion 1204 may represent structures or components of a display portion 1202 and/or base portion 1204 of a device, rather than complete base and display portions. It will be understood that the base and display portions shown in FIG. 12A are used to illustrate structural and functional interrelationships, rather than a complete product. The device 1200 also includes a hinge mechanism 1206 movably coupling the display portion 1202 to the base portion 1204. The device 1200 may also include a motor 1208 that provides the motive force to move the display portion 1202 relative to the base portion 1204. As shown, the motor 1208 is integrated with the hinge mechanism 1206 (e.g., it is positioned in a barrel or chamber defined by the hinge mechanism 1206), though this is merely one example integration.

Figure 12B:
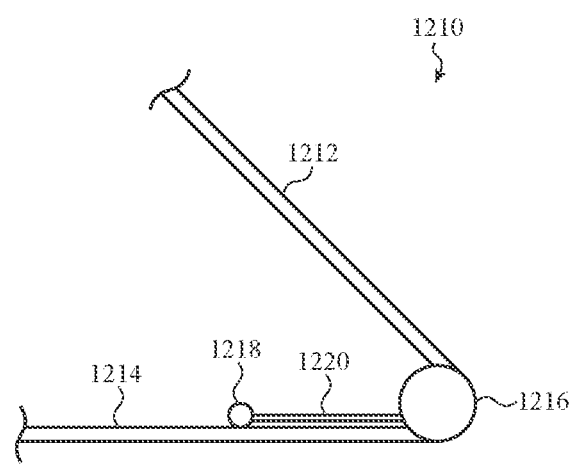

FIG. 12B illustrates an example device 1210 (e.g., a laptop computer), that includes a base portion 1214 and a display portion 1212 movably coupled to the base portion 1214. As shown, the display portion 1212 and the base portion 1214 may represent structures or components of a display portion 1212 and/or base portion 1214 of a device, rather than complete base and display portions. It will be understood that the base and display portions shown in FIG. 12B are used to illustrate structural and functional interrelationships, rather than a complete product. The device 1210 also includes a hinge mechanism 1216 movably coupling the display portion 1212 to the base portion 1214. The device 1210 may also include a motor 1218 that provides the motive force to move the display portion 1212 relative to the base portion 1214. As shown, the motor 1218 is positioned in or otherwise coupled to the base portion 1214, and a strap, cord, wire, bar, or other member 1220 may extend from the motor 1218 to the hinge mechanism 1216 and/or the display portion 1212. The motor 1218 may retract or pay out the member 1220 in order to move the display portion 1212 relative to the base portion 1214 according to the techniques described herein. In some cases, the motor 1218 is positioned in the display portion 1212.

In some cases, the devices 1200, 1210 may use SMA materials in addition to the electric motors. For example, electric motors may be used to produce larger movements, such as moving a display portion from a closed position to an open position, while actuation systems with SMA members may be used to produce smaller movements, such as moving the display portion to maintain a desired viewing angle.

Figure 13:
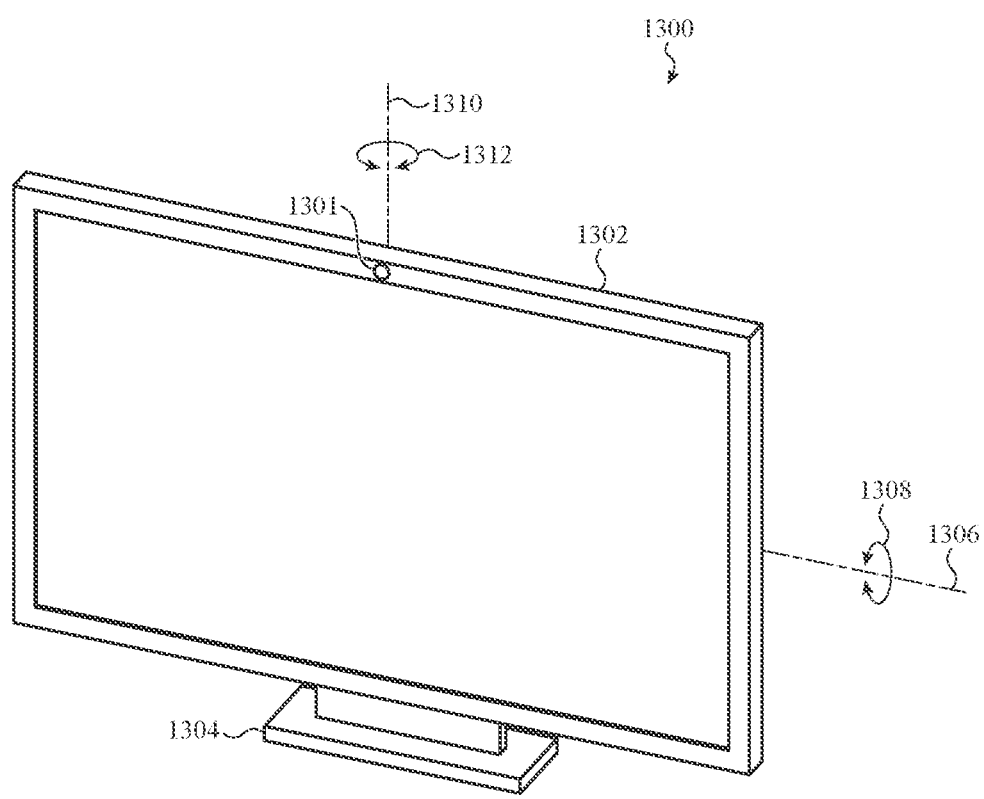
FIG. 13 depicts another example electronic device with an actuation system using shape-memory alloy materials.
Figure 14A:
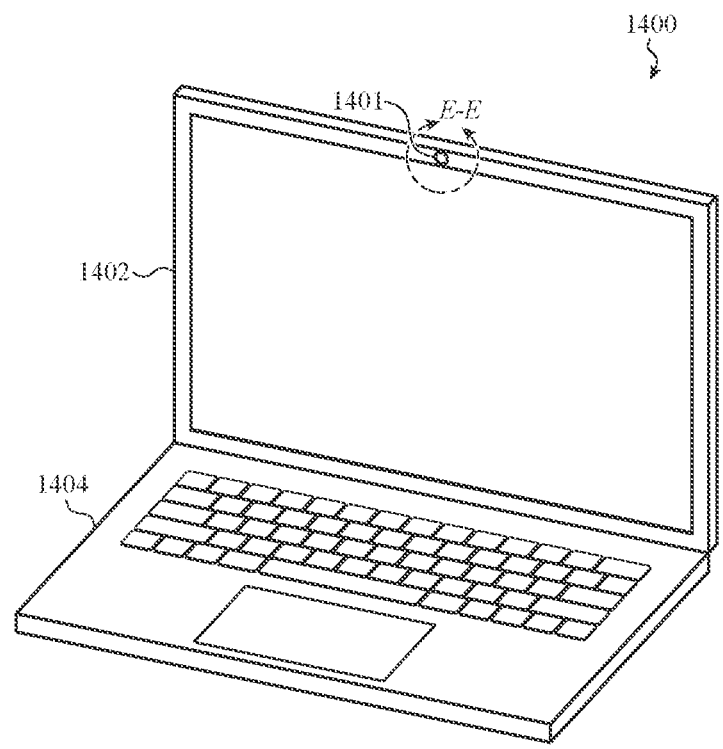
FIGS. 14A-14B depict another example electronic device with an actuation system using shape-memory alloy materials.
Figure 14B:
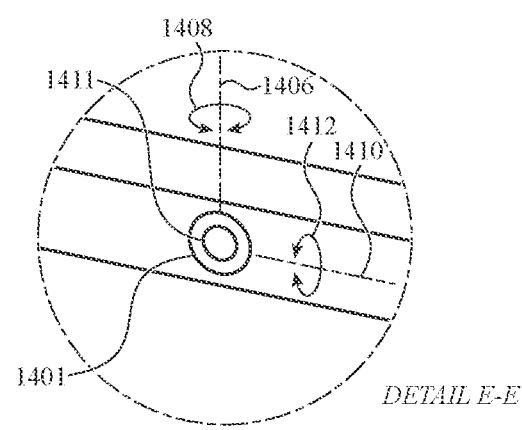
Figure 15:
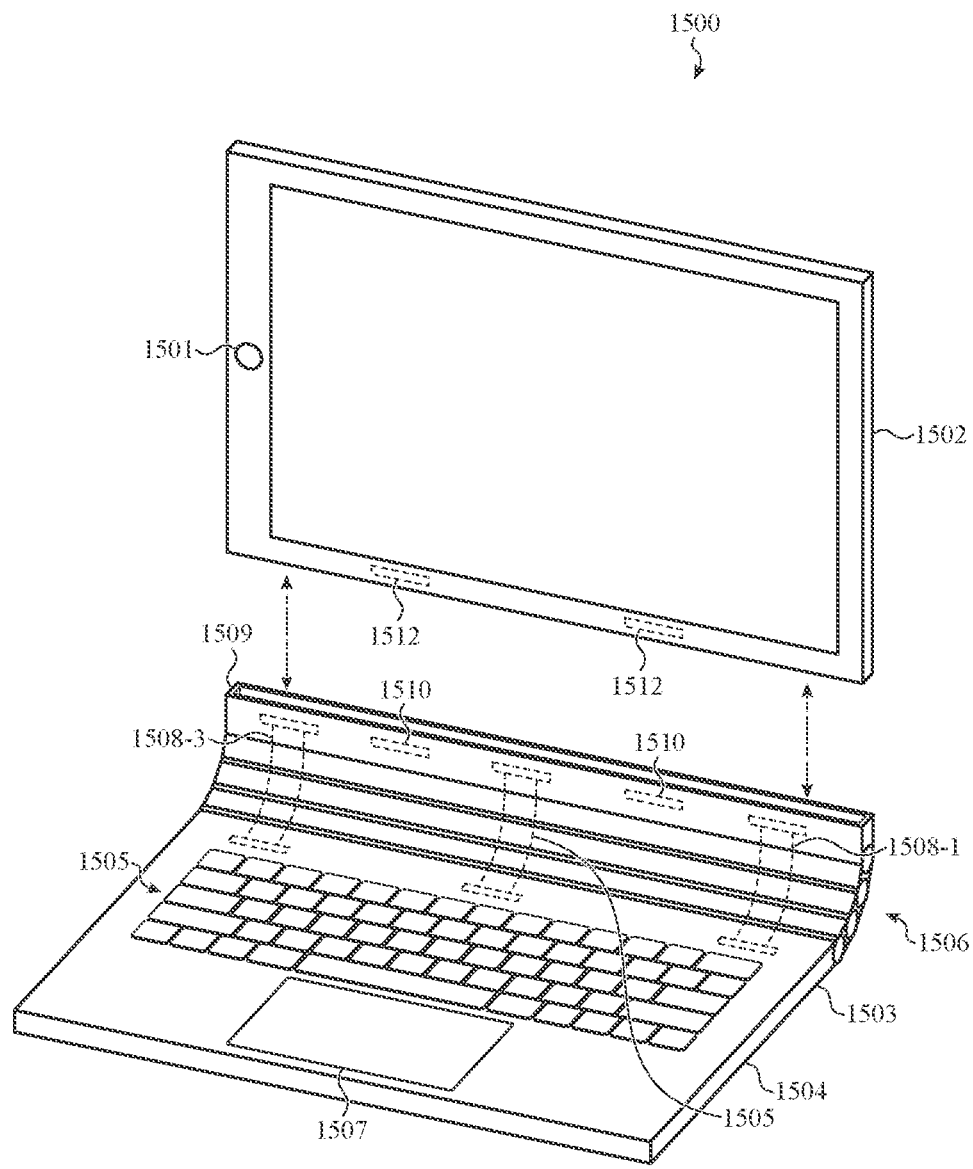
FIG. 15 depicts another example electronic device with an actuation system using shape-memory alloy materials.

The techniques described herein for moving a portion of a device to provide an advantageous viewing experience may be integrated into laptop computers in other ways, and also may be used with devices other than laptop computers. FIGS. 13-15 illustrate some such examples. FIG. 13 illustrates a device 1300 that includes a base portion 1304 and a display portion 1302 movably coupled to the base portion 1304 (e.g., via a hinge mechanism). The device 1300 may represent a display peripheral for a computer, a television, a stand-alone computer, or the like. The device 1300 also includes an optical sensing system 1301 (e.g., a camera, biometric sensing system, light detection and ranging (LIDAR) sensor, or the like). The device 1300 may also include an actuation system, which may include an SMA material member, an electric motor, or the like, that can move the display portion 1302 relative to the base portion 1304. For example, the actuation system may be configured to move the display portion 1302 about a first axis 1306 (e.g., pitching up and down, as indicated by arrow 1308) and/or about a second axis 1310 (e.g., twisting left and right, as indicated by arrow 1312). These motions may be performed in order to reorient the display to provide a target or ideal viewing condition, or to maintain an object in a frame or field of view of the optical sensing system 1301 (e.g., during video conferences or other image capture functions).

SMA materials may also be used to move components of a device other than a display portion. For example, FIGS. 14A-14B illustrate a device 1400 (shown as a laptop computer) with an optical sensing system 1401 that uses SMA materials to change the direction and/or orientation of a lens or other image capture component. The device 1400 may include a base portion 1404 and a display portion 1402, and the optical sensing system 1401 may be positioned in the display portion 1402.

FIG. 14B illustrates a detail view of the area E-E in FIG. 14A. The optical sensing system 1401 may include a lens 1411. SMA members may be engaged with the lens 1411 or otherwise configured to move the lens 1411 about a first axis 1410 (e.g., pitching up and down, as indicated by arrow 1412) and/or about a second axis 1406 (e.g., twisting left and right, as indicated by arrow 1408). These motions may be performed in order to maintain an object in a frame or field of view of the optical sensing system 1401 (e.g., during video conferences or other image capture functions). For example, if a user changes the position of the display portion 1402 during an image capture function, the optical sensing system 1401 may move the lens 1411 to keep the same objects in the same or substantially the same positions in the image. As another example, if a user changes his or her position relative to the optical sensing system 1401, the lens 1411 may move to maintain the user in the same or substantially the same position in the frame.

FIG. 15 illustrates another example device that may use the structures and techniques described herein. For example, FIG. 15 illustrates a device or system 1500 or system that includes a display portion 1502 and a base portion 1504. The display portion 1502 may be removable from the base portion 1504. For example, the display portion 1502 may be a tablet computing system, a mobile phone, or other stand-alone computing system. Accordingly, the display portion 1502 may include components such as a display, a battery, a processor or processing system, memory, input systems (e.g., touch- and/or force-sensitive input systems), an optical sensing system 1501 (e.g., a camera, LIDAR, biometric sensor), and the like.

The base portion 1504 may include a body 1503, which may act as a base or stand portion for the device or system 1500. The body 1503 may include or house a keyboard 1505, a trackpad 1507, and/or other input/output components or systems. The base portion 1504 may further include a coupling system 1509 configured to removably couple the base portion 1504 to the display portion 1502, and a hinge mechanism 1506 movably coupling the body 1503 to the coupling system 1509. The hinge mechanism 1506 resembles the hinge mechanism 806 in FIGS. 8A-8B, and includes actuation systems 1508 (e.g., actuation systems 1508-1, 1508-2, 1508-3) that are coupled to the body 1503 and to the coupling system 1509 and are configured to move the coupling system 1509 relative to the body 1503 (and thus move the display portion 1502 relative to the base portion 1504 and body 1503 when the display portion 1502 is attached to the base portion 1504). The actuation systems 1508 may include SMA members to provide forces to move the coupling system 1509 according to the techniques described herein. The description of the SMA members and the actuation systems provided with respect to FIGS. 8A-8B apply equally to the corresponding components in FIG. 15, and will not be repeated here for brevity.

The coupling system 1509 includes a first magnetic attachment system 1510, and the display portion 1502 includes a second magnetic attachment system 1512 configured to magnetically couple to the first magnetic attachment system 1510. When the display portion 1502 is coupled to the base portion 1504 via the coupling system 1509, the base portion 1504 may use the actuation systems 1508 to move the display portion 1502 using the techniques described herein (e.g., to orient the display portion 1502 to achieve a target or desired viewing experience, to maintain a user or other object in a field of view of a camera, or the like). Because the coupling system 1509 (via the magnetic attachment systems 1510, 1512) allow the display portion 1502 to be removably coupled to the base portion 1504, a user can remove the display portion 1502 when it is desired to use the display portion 1502 in a standalone mode, and easily replace the display portion 1502 on the base portion 1504 so that the system 1500 can be used in a manner similar to a laptop computer.

The display portion 1502 and the base portion 1504 may communicate with each other via a communication link or path (e.g., a wireless communication link, a physical or conductive connector integrated with the coupling system 1509, or the like). The display portion 1502 and the base portion 1504 may communicate in order to facilitate movement of the display portion 1502 as described herein. For example, the display portion 1502 may capture image data or other information (e.g., with its optical sensing system 1501) that may be used to determine the target position of the display portion 1502. Such information (including optionally the target position itself) may be communicated to the base portion 1504, which then causes the display portion 1502 to be moved to or towards the target position.

Figure 16:
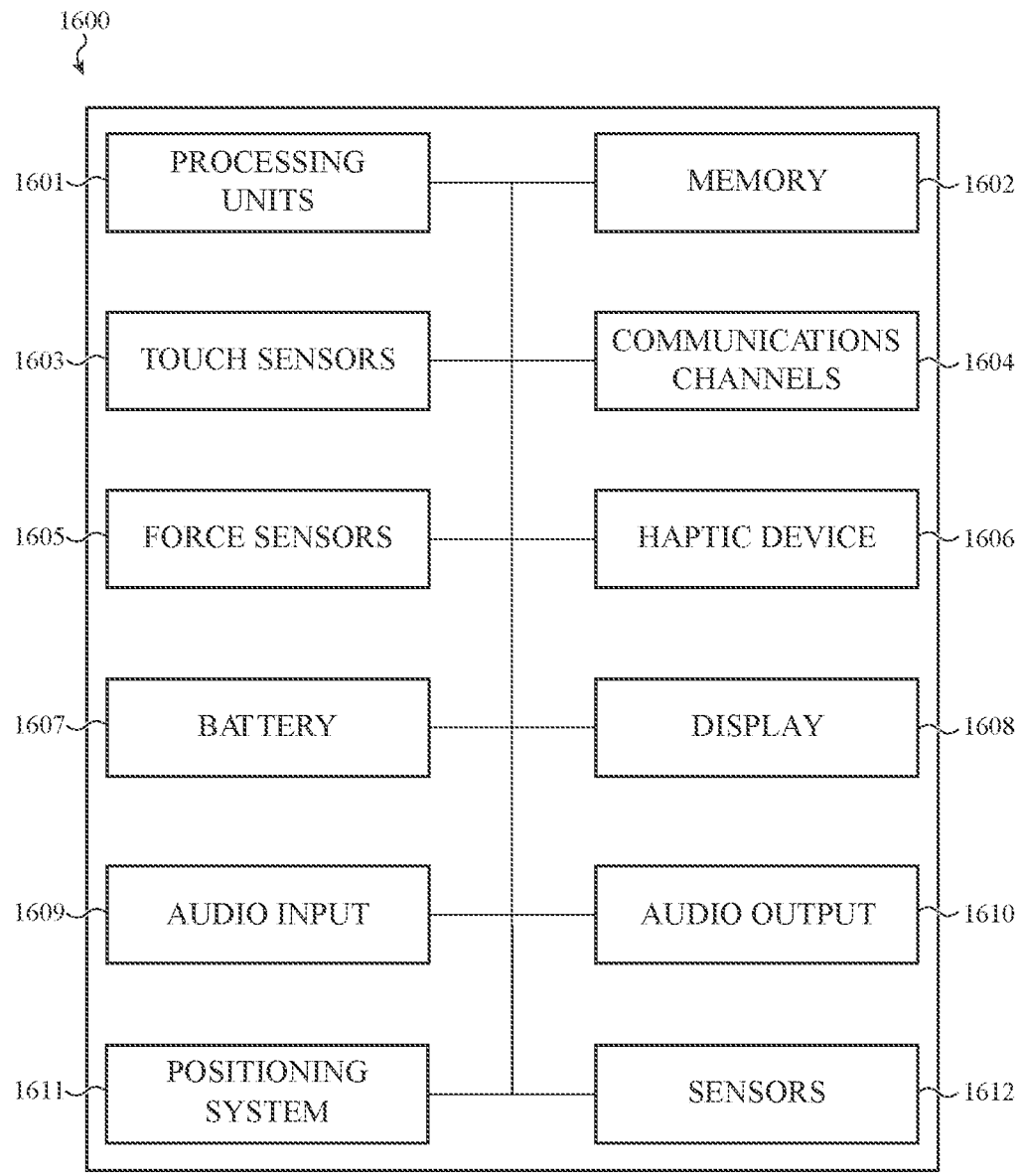
FIG. 16 depicts a schematic diagram of an example electronic device.

FIG. 16 depicts an example schematic diagram of an electronic device 1600. The electronic device 1600 may be an embodiment of or otherwise represent any of the devices and/or systems described herein. For example, the device 1600 may be an embodiment of the devices 100, 200, 300, 400, 500, 600, 700, 800, 900, 1000, 1200, 1300, 1400, 1500 (including the display portion 1502, the base portion 1504, or the display and base portions together).

The device 1600 includes one or more processing units 1601 that are configured to access a memory 1602 having instructions stored thereon. The processing units 1601 may be or may be part of a processing system of the device 1600. The instructions or computer programs may be configured to perform one or more of the operations or functions described with respect to the electronic devices described herein. For example, the instructions may be configured to control or coordinate the operation of one or more displays 1608, one or more touch sensors 1603, one or more force sensors 1605, one or more communication channels 1604, one or more audio input systems 1609, one or more audio output systems 1610, one or more positioning systems 1611, one or more sensors 1612, and/or one or more haptic feedback devices 1606.

The processing units 1601 of FIG. 16 may be implemented as any electronic device capable of processing, receiving, or transmitting data or instructions. For example, the processing units 1601 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processing units 1601 may be coupled to a circuit board.

The memory 1602 can store electronic data that can be used by the device 1600. For example, a memory can store electrical data or content such as, for example, audio and video files, images, documents and applications, device settings and user preferences, programs, instructions, timing and control signals or data for the various modules, data structures or databases, and so on. The memory 1602 can be configured as any type of memory. By way of example only, the memory can be implemented as random access memory, read-only memory, Flash memory, removable memory, or other types of storage elements, or combinations of such devices.

The touch sensors 1603, also referred to herein as touch-sensing systems, may detect various types of touch-based inputs and generate signals or data that are able to be accessed using processor instructions. The touch sensors 1603 may use any suitable components and may rely on any suitable phenomena to detect physical inputs. For example, the touch sensors 1603 may be capacitive touch sensors, resistive touch sensors, acoustic wave sensors, or the like. The touch sensors 1603 may include any suitable components for detecting touch-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The touch sensors 1603 may be integrated with or otherwise configured to detect touch inputs applied to any portion of the device 1600. For example, the touch sensors 1603 may be configured to detect touch inputs applied to any portion of the device 1600 that includes a display (and may be integrated with a display). The touch sensors 1603 may be configured to detect touch inputs applied to a housing or enclosure of a device, such as to detect an input requesting that the display portion be automatically opened (at least partially), as described with respect to FIGS. 5A-5C, for example. The touch sensors 1603 may operate in conjunction with the force sensors 1605 to generate signals or data in response to touch inputs. A touch sensor or force sensor that is positioned over a display or otherwise integrated with a display may be referred to herein as a touch-sensitive display, force-sensitive display, or touchscreen.

The force sensors 1605 may detect various types of force-based inputs and generate signals or data that are able to be accessed using processor instructions. The force sensors 1605 may use any suitable components and may rely on any suitable phenomena to detect physical inputs. For example, the force sensors 1605 may be strain-based sensors, piezoelectric-based sensors, piezoresistive-based sensors, capacitive sensors, resistive sensors, or the like. The force sensors 1605 may include any suitable components for detecting force-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The force sensors 1605 may be used in conjunction with various input mechanisms to detect various types of inputs. For example, the force sensors 1605 may be used to detect presses or other force inputs that satisfy a force threshold (which may represent a more forceful input than is typical for a standard "touch" input) Like the touch sensors 1603, the force sensors 1605 may be integrated with or otherwise configured to detect force inputs applied to any portion of the device 1600. As a specific example, force sensors 1605 may be configured to detect force inputs applied to a surface of a housing or enclosure to detect an input requesting opening of a display portion. The force sensors 1605 may be configured to detect force inputs applied to portions of the device 1600 that include a display (and may be integrated with the display). The force sensors 1605 may operate in conjunction with the touch sensors 1603 to generate signals or data in response to touch- and/or force-based inputs.

The device 1600 may also include one or more haptic feedback devices 1606 (also referred to simply as haptic devices 1606). The haptic device 1606 may include one or more of a variety of haptic technologies such as, but not necessarily limited to, rotational haptic devices, linear actuators, piezoelectric devices, vibration elements, and so on. In general, the haptic device 1606 may be configured to provide punctuated and distinct feedback to a user of the device. More particularly, the haptic device 1606 may be adapted to produce a knock or tap sensation and/or a vibration sensation. Such haptic outputs may be provided in response to detection of touch and/or force inputs, and may be imparted to a user through an exterior surface of the device 1600 (e.g., via a trackpad surface, touchscreen surface, or keyboard surface or component).

The one or more communication channels 1604 may include one or more wireless interface(s) that are adapted to provide communication between the processing unit(s) 1601 and an external device. The one or more communication channels 1604 may include antennas, communications circuitry, firmware, software, or any other components or systems that facilitate wireless communications with other devices. In general, the one or more communication channels 1604 may be configured to transmit and receive data and/or signals that may be interpreted by instructions executed on the processing units 1601. In some cases, the external device is part of an external communication network that is configured to exchange data with wireless devices. Generally, the wireless s interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces, TCP/IP interfaces, network communications interfaces, or any conventional communication interfaces.

As shown in FIG. 16, the device 1600 may include a battery 1607 that is used to store and provide power to the other components of the device 1600. The battery 1607 may be a rechargeable power supply that is configured to provide power to the device 1600. The battery 1607 may be coup led to charging systems (e.g., wired and/or wireless charging systems) and/or other circuitry to control the electrical power provided to the battery 1607 and to control the electrical power provided from the battery 1607 to the device 1600.

The device 1600 may also include one or more displays 1608 configured to display graphical outputs. The displays 1608 may use any suitable display technology, including liquid crystal displays (LCD), organic light emitting diodes (OLED), active-matrix organic light-emitting diode displays (AMOLED), or the like. The displays 1608 may display graphical user interfaces, images, icons, or any other suitable graphical outputs. The one or more displays 1608 may correspond to any displays (and/or the displays of any display portions) described herein.

The device 1600 may also provide audio input functionality via one or more audio input systems 1609. The audio input systems 1609 may include microphones, transducers, or other devices that capture sound for voice calls, video calls, audio recordings, video recordings, voice commands, and the like.

The device 1600 may also provide audio output functionality via one or more audio output systems (e.g., speakers) 1610. The audio output systems 1610 may produce sound from voice calls, video calls, streaming or local audio content, streaming or local video content, alerts or notifications, or the like.

The device 1600 may also include a positioning system 1611. The positioning system 1611 may be configured to determine the location, position, and/or orientation of the device 1600. For example, the positioning system 1611 may include magnetometers, gyroscopes, accelerometers, optical sensors, cameras, global positioning system (GPS) receivers, inertial positioning systems, or the like. The positioning system 1611 may be used to determine spatial parameters of the device 1600, such as the location of the device 1600 (e.g., geographical coordinates of the device), measurements or estimates of physical movement of the device 1600, an orientation of the device 1600, or the like. The positioning system 1611 may be used to provide information for determining a target position of a display portion of a device, or to control the movement of a display portion of a device.

The device 1600 may also include one or more sensors 1612 to receive inputs (e.g., from a user or another computer, device, system, network, etc.) or to detect any suitable property or parameter of the device, the environment surrounding the device, people or things interacting with the device (or nearby the device), or the like. The sensors 1612 may include optical sensing systems such as cameras, lenses, photo sensors, LIDAR, biometric sensors, acoustic sensors, gaze detection sensors, facial scanners, retinal scanners, eye-tracking sensors, or the like. The sensors 1612 may provide information that a processing system may use to determine target positions for display portions, determine a physical disposition of a user (e.g., a gaze direction, the position of a user relative to a viewing vector of a display, etc.), or the like To the extent that multiple functionalities, operations, and structures described with reference to FIG. 16 are disclosed as being part of, incorporated into, or performed by the device 1600, it should be understood that various embodiments may omit any or all such described functionalities, operations, and structures. Thus, different embodiments of the device 1600 may have some, none, or all of the various capabilities, apparatuses, physical features, modes, and operating parameters discussed herein. Further, the systems included in the device 1600 are not exclusive, and the device 1600 may include alternative or additional systems, components, modules, programs, instructions, or the like, that may be necessary or useful to perform the functions described herein.

As described above, one aspect of the present technology is the gathering and use of data available from various sources to determine how and/or when to move a display portion of a computer to provide functions as described herein. The present disclosure contemplates that in some instances, this gathered data may include personal information data that uniquely identifies or can be used to contact or locate a specific person. Such personal information data can include image data (e.g., of a user's face, body, and/or surroundings), biometric data (e.g., from facial scans, retinal scans, etc.), demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of optical and/or biometric sensing systems, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

What is claimed is:

1. A notebook computer comprising:
   a display portion;
   a base portion;
   a hinge mechanism movably coupling the display portion to the base portion;
   an optical sensing system configured to capture an image of an object;
   an actuation system comprising a shape-memory alloy member coupled to the base portion and the display portion and configured to move the display portion relative to the base portion; and
   a processing system configured to:
      determine a target position for the display portion based at least in part on a location of the object in the image; and
      cause the actuation system to actuate the hinge mechanism to move the display portion, relative to the base portion, from an initial position to the target position.

2. The notebook computer of claim 1, wherein:
   the base portion comprises a keyboard;
   the shape-memory alloy member is a first shape-memory alloy member and is configured to produce a first force to move the display portion in a first direction relative to the base portion;
   the actuation system further comprises a second shape-memory alloy member configured to produce a second force to move the display portion in a second direction, opposite the first direction, relative to the base portion;
   the optical sensing system comprises a camera and is coupled to the display portion; and
   the processing system is configured to:
      cause a first electrical current to be applied to the first shape-memory alloy member to produce the first force; and
      cause a second electrical current to be applied to the second shape-memory alloy member to produce the second force.

3. The notebook computer of claim 1, wherein the processing system is configured to determine the target position for the display portion by:
   determining a location of a user in the image captured by the optical sensing system;
   determining an offset between the location of the user in the image and a target user location; and determining the target position based at least in part on the offset.

4. The notebook computer of claim 3, wherein determining the location of the user in the image comprises determining the location of the user's eyes in the image.

5. The notebook computer of claim 1, wherein:
the shape-memory alloy member is a first shape-memory alloy member and is configured to move the display portion towards an open position relative to the base portion in response to having a first current passed therethrough; and
the actuation system further comprises a second shape-memory alloy member configured to move the display portion towards a closed position relative to the base portion in response to having a second current passed therethrough.

6. The notebook computer of claim 5, further comprising:
a first anchor retaining a first end of the first shape-memory alloy member to the base portion; and
a second anchor retaining a second end of the first shape-memory alloy member to the display portion.

7. The notebook computer of claim 1, further comprising a position feedback system configured to determine an actual position of the display portion relative to the base portion.

8. A portable computing system comprising:
a display portion;
a base portion movably coupled to the display portion;
an optical sensing system configured to determine a gaze direction of a user;
an actuation system comprising:
a first shape-memory alloy member configured to rotate the display portion in a first direction relative to the base portion; and
a second shape-memory alloy member configured to rotate the display portion in a second direction relative to the base portion, the second direction opposite the first direction; and
a processing system configured to:
determine a target position for the display portion based at least in part on the gaze direction of the user; and
cause the actuation system to rotate the display portion, relative to the base portion, from an initial position to the target position.

9. The portable computing system of claim 8, wherein:
the optical sensing system is configured to determine an angle between the gaze direction of the user and a plane defined by the display portion; and
the target position corresponds to a position of the display portion at which the angle between the gaze direction of the user and the plane defined by the display portion is equal to a target viewing angle.

10. The portable computing system of claim 9, further comprising a position feedback system configured to determine an actual position of the display portion relative to the base portion.

11. The portable computing system of claim 8, wherein the base portion comprises:
a body;
a coupling system configured to removably couple the base portion to the display portion; and
a hinge mechanism movably coupling the body to the coupling system.

12. The portable computing system of claim 11, wherein:
the coupling system comprises a first magnetic attachment system; and
the display portion comprises a second magnetic attachment system configured to magnetically couple to the first magnetic attachment system.

13. The portable computing system of claim 11, wherein the body of the base portion comprises a keyboard.

14. The portable computing system of claim 8, wherein the optical sensing system comprises:
a projector configured to project a pattern of light onto the user; and
a sensor configured to sense at least a portion of the pattern of light that is reflected by the user.

15. A portable computing system comprising:
a display portion;
a base portion;
a hinge mechanism movably coupling the display portion to the base portion;
a shape-memory alloy member extending through the hinge mechanism and configured to articulate the hinge mechanism to move the display portion relative to the base portion;
a sensing system configured to detect a physical disposition of a user relative to the portable computing system; and
a processing system configured to:
determine a target position for the display portion based at least in part on the physical disposition of the user; and
cause the shape-memory alloy member to articulate the hinge mechanism to move the display portion, relative to the base portion, from an initial position to the target position.

16. The portable computing system of claim 15, wherein the physical disposition of the user relative to the portable computing system corresponds to at least one of an orientation of the user's eyes or a position of the user's face.

17. The portable computing system of claim 15, further comprising a brake positioned in the base portion and configured to selectively inhibit motion of the shape-memory alloy relative to the base portion.

18. The portable computing system of claim 17, wherein the processing system is configured to engage the brake to inhibit motion of the shape-memory alloy relative to the base portion while the shape-memory alloy is articulating the hinge mechanism.

19. The portable computing system of claim 15, wherein the processing system is further configured to cause the shape-memory alloy member to articulate the hinge mechanism to move the display portion, relative to the base portion, from a closed position to an open position.

20. The portable computing system of claim 19, wherein:
the portable computing system further comprises a touch sensitive input system configured to detect an input; and
the processing system is configured to cause the shape-memory alloy to articulate the hinge mechanism to move the display portion, relative to the base portion, from the closed position to the open position in response to detection of the input.

* * * * *